US012549491B2

(12) United States Patent
Han et al.

(10) Patent No.: US 12,549,491 B2
(45) Date of Patent: Feb. 10, 2026

(54) RoCE NETWORK CONGESTION CONTROL METHOD AND RELATED APPARATUS

(71) Applicant: Huawei Technologies Co., Ltd., Shenzhen (CN)

(72) Inventors: Zhaojiao Han, Shenzhen (CN); Zhijun Bai, Shenzhen (CN); Yuanpan Qian, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 172 days.

(21) Appl. No.: 18/178,117

(22) Filed: Mar. 3, 2023

(65) Prior Publication Data

US 2023/0208771 A1   Jun. 29, 2023

Related U.S. Application Data

(63) Continuation of application No. PCT/CN2021/116494, filed on Sep. 3, 2021.

(30) Foreign Application Priority Data

Sep. 3, 2020   (CN) .......................... 202010915720.6

(51) Int. Cl.
*H04L 47/27* (2022.01)
*H04L 47/12* (2022.01)

(52) U.S. Cl.
CPC .............. *H04L 47/27* (2013.01); *H04L 47/12* (2013.01)

(58) Field of Classification Search
CPC ................................ H04L 47/27; H04L 47/12
USPC ....................................................... 709/238
See application file for complete search history.

(56) References Cited

U.S. PATENT DOCUMENTS

| 8,762,595 | B1* | 6/2014 | Muller | G06F 13/385 |
| | | | | 710/33 |
| 10,742,555 | B1* | 8/2020 | Shalev | H04L 67/563 |
| 11,838,208 | B2* | 12/2023 | Dong | H04L 47/12 |
| 2004/0066743 | A1* | 4/2004 | Shimojo | H04L 45/60 |
| | | | | 370/445 |

(Continued)

FOREIGN PATENT DOCUMENTS

| CN | 107135164 A | 9/2017 | |
| CN | 110445722 A | 11/2019 | |
| WO | WO-2019219184 A1 * | 11/2019 | ............ H04L 47/10 |

OTHER PUBLICATIONS

Li et al. "HPCC: high precision congestion control," Aug. 19, 2019, ACM, SIGCOMM '19: Proceedings of the ACM Special Interest Group on Data Communication, pp. 44-58, https://dl.acm.org/doi/10.1145/3341302.3342085 (Year: 2019).*

(Continued)

*Primary Examiner* — Ruolei Zong
(74) *Attorney, Agent, or Firm* — Conley Rose, P.C.

(57) ABSTRACT

An RoCE network congestion control method includes a first network device that sends a RoCE protocol packet to a second network device. The first network device receives an acknowledgment packet from the second network device that includes indication information and acknowledgment information in response to the RoCE protocol packet. The indication information indicates whether a network path between the first network device and the second network device is congested. The first network device performs congestion control based on the acknowledgment packet.

20 Claims, 14 Drawing Sheets

(56) References Cited

U.S. PATENT DOCUMENTS

| | | | |
|---|---|---|---|
| 2005/0114540 A1* | 5/2005 | Hariharan | H04L 47/10 709/232 |
| 2015/0341273 A1* | 11/2015 | Naouri | H04L 47/18 370/231 |
| 2017/0168986 A1* | 6/2017 | Sajeepa | G06F 15/17331 |
| 2019/0044861 A1* | 2/2019 | Wandler | H04L 47/12 |
| 2019/0089644 A1* | 3/2019 | Shpiner | H04L 49/30 |
| 2019/0116126 A1 | 4/2019 | Shen et al. | |
| 2019/0173810 A1* | 6/2019 | Shpiner | H04L 47/6225 |
| 2020/0125511 A1* | 4/2020 | Thubert | G06F 15/17331 |
| 2020/0145349 A1 | 5/2020 | Menachem et al. | |
| 2020/0280518 A1* | 9/2020 | Lee | H04L 47/115 |
| 2021/0051102 A1* | 2/2021 | Dong | H04L 47/193 |
| 2021/0112002 A1* | 4/2021 | Pan | H04L 47/25 |
| 2021/0119930 A1* | 4/2021 | Debbage | H04L 1/1642 |
| 2021/0152474 A1* | 5/2021 | Shpigelman | H04L 47/12 |
| 2022/0060417 A1* | 2/2022 | Kfir | H04L 45/66 |

OTHER PUBLICATIONS

InfiniBand™ Architecture, Specification vol. 1, Release1.3, vol. 1—General Specifications, Mar. 3, 2015,1842 pages.

Supplement to InfiniBand™, Architecture Specification, vol. 1 Release 1.2.1, Annex A17:RoCEv2, vol. 1—General Specifications, Sep. 2, 2014, 23 pages.

* cited by examiner

RoCE NETWORK CONGESTION CONTROL METHOD AND RELATED APPARATUS

CROSS-REFERENCE TO RELATED APPLICATIONS

This application is a continuation of International Patent Application No. PCT/CN2021/116494, filed on Sep. 3, 2021, which claims priority to Chinese Patent Application No. 202010915720.6, filed on Sep. 3, 2020. The disclosures of the aforementioned applications are hereby incorporated by reference in their entireties.

TECHNICAL FIELD

The present disclosure relates to the field of communication technologies, and in particular, to a RoCE network congestion control method and a related apparatus.

BACKGROUND

In a data communication system, to increase a rate of packet transmission between computing devices, a remote direct memory access (RDMA) technology is usually used for connection. In the RDMA technology, data is directly transferred to a storage area of a computer over a network to quickly move the data from a system to a remote system memory, without participation of operating systems or kernels of two computing devices. Overheads of external memory replication and context switching are eliminated in RDMA, to free up memory bandwidth and a central processing unit (CPU) cycle to improve application system performance.

Remote direct memory access over converged Ethernet (ROCE) is one of RDMA technologies and allows a server to perform remote direct memory access over the Ethernet. Although a main advantage of the ROCE protocol lies in a characteristic over converged Ethernet, the ROCE protocol may also be applied to a conventional Ethernet network or a non-converged Ethernet network.

When congestion occurs due to excessively large traffic in a network (traffic of packets sent from a port of a source end may be relatively large in a time period), the DCQCN specifies that a congestion point (CP) device performs random early detection (RED) explicit congestion notification (ECN) marking on a packet. For a receive end that supports the ROCE protocol, when receiving a packet carrying an ECN flag, the receive end sends an independent congestion notification packet (CNP) to the source end to notify that network congestion occurs; and the source end reduces, based on the CNP packet, a sending rate of a subsequent packet to a specific value to eliminate congestion.

A RoCE protocol-based network congestion notification is provided by using an independent CNP packet. Therefore, after network congestion occurs, a network interface card at the receive end needs to continuously send acknowledgment (ACK) packets and CNP packets. However, because a packet sending rate of the network interface card at the receive end has an upper limit, sending of a congestion notification may be delayed. Consequently, a congestion control response speed of the source end is low.

In addition, a CNP packet can only be used to notify the source end that network congestion occurs, but cannot be used to notify that network congestion has been eliminated, and whether network congestion is eliminated can be periodically detected only by the source end. As a result, the source end cannot restore a packet sending rate in time, affecting effective utilization of network bandwidth.

SUMMARY

Embodiments of the present disclosure provide a RoCE network congestion control method and a related apparatus, to notify in time that network congestion occurs and that network congestion is eliminated, thereby increasing a congestion control response speed of a source end, and improving utilization of network bandwidth.

According to a first aspect, the present disclosure provides a RoCE network congestion control method. The method includes a first network device sends a RoCE protocol packet to a second network device; the first network device receives an acknowledgment packet from the second network device, where the acknowledgment packet includes indication information and acknowledgment information that is specific to the ROCE protocol packet, and the indication information indicates whether a network path between the first network device and the second network device is congested; and the first network device performs congestion control based on the acknowledgment packet.

Both the first network device and the second network device are hardware designed to allow a computing device to perform communication through a network, and support ROCE protocol-based network communication. The ROCE protocol is a network protocol that allows to perform RDMA over the Ethernet. The first network device and the second network device each may be, for example, an RDMA network interface controller (RNIC), a network interface controller, a network adapter, a network interface card, or a local area network (LAN) adapter. In a possible implementation, at least one of the first network device and the second network device may alternatively be a switch device.

The first network device may be disposed in a source end device, and the second network device may be disposed in a destination end device. Therefore, the source end device and the destination end device may implement remote data reading/writing and transmission based on communication interaction between the first network device and the second network device.

It can be learned that, during implementation of this embodiment of the present disclosure, the source end device may send the packet by using the first network device, and the destination end device may return, by using the second network device, the acknowledgment information packet in which the indication information is aggregated, where the indication information is used to notify the first network device whether network congestion occurs in the current network path. In this way, the first network device can obtain a status of a current network, that is, whether the current network is congested or not congested, so that the first network device can perform a corresponding congestion control operation based on the status of the current network. For example, when the network is not congested, the first network device can maintain or restore to a high sending rate in time. Therefore, the indication information and the acknowledgment information to avoid a disadvantage in a conventional solution that an independent CNP needs to be sent, thereby reducing notification overheads, helping to reduce a congestion notification delay in a large-traffic scenario, and increasing a response speed of the destination end device. In addition, the source end device can immediately learn of a network congestion status based on the indication information, to trigger congestion control earlier to adjust a sending rate, thereby increasing a response speed of the source end device. When network congestion is eliminated, the source end device can also learn, based on the indication information, that network congestion is eliminated, and restore a sending rate in time, thereby improving utilization of network bandwidth.

Based on the first aspect, in a specific embodiment, when the indication information indicates that the network path is congested, the acknowledgment packet further includes congestion information, and the congestion information further includes at least one of the following information: a congestion degree, a congestion location, a packet queue length, and a network delay that are of the network path; and that the first network device performs congestion control based on the acknowledgment packet further includes: The first network device performs congestion control based on the congestion information.

It can be learned that, during implementation of this embodiment of the present disclosure, when network congestion occurs in the current network path, the acknowledgment packet may further carry the congestion information, and the congestion information represents detailed network status content. In this way, the first network device in the source end device can extract the congestion information to perform quantitative and diversified congestion control operations. Therefore, the indication information, the congestion information, and the acknowledgment information to avoid sending of an independent CNP, thereby reducing notification overheads, helping to reduce a congestion notification delay in a large-traffic scenario, and increasing a response speed of the destination end device. In addition, during existing RDMA network congestion control, there is a small amount of notification information, and a convergence speed during network congestion control is low. In contrast, in the present disclosure, an aggregated packet is used to carry detailed congestion information, for example, information in different dimensions such as a congestion degree, a congestion location, a queue depth, and a network delay. This helps the first network device perform diversified, differentiated, and specific congestion control based on the detailed congestion information, for example, adjusting sending rates of different levels, or implementing diversified adjustment of a quantity of packets, a sending time, and the like, thereby greatly improving a congestion control effect.

Based on the first aspect, in a possible embodiment, the first network device performs congestion control based on the congestion information in at least one of the following manners:

(1) The first network device may quantitatively adjust a packet sending rate of the first network device in a next time window based on the congestion degree. In a possible embodiment, the congestion degree is one of congestion degrees at a plurality of different levels, and the congestion degrees at the different levels correspond to different sending rates. There is a correspondence between the congestion degree and the sending rate. For example, for a plurality of levels such as "no congestion, slight congestion, moderate congestion, and severe congestion", the first network device may determine, based on a specific congestion degree, how to implement rate reduction processing. Different levels may correspond to different packet sending rates to adjust packet sending rates of different levels. Therefore, faster rate convergence can be implemented.

(2) The first network device may determine a quantity of to-be-sent packets in a next time window based on at least one of the congestion location and the packet queue depth. An RNIC in the source end device may determine, based on the congestion location and/or the packet queue depth, a quantity of data packets that can continue to be sent in the network path without causing a packet loss and the like, to determine a quantity of packets that can continue to be sent. This is relatively friendly to a network application with a high bandwidth requirement.

(3) The first network device may adjust a sending rate of the first network device or a quantity of to-be-sent packets in a next time window based on the network delay.

It can be learned that, during implementation of this embodiment of the present disclosure, an aggregated packet is used to carry detailed congestion information, for example, information in different dimensions such as a congestion degree, a congestion location, a queue depth, and a network delay. This helps the first network device perform diversified, differentiated, and specific congestion control based on the detailed congestion information, thereby greatly improving a congestion control effect.

Based on the first aspect, in a possible embodiment, the acknowledgment packet further includes a basic transmission header (BTH) field and an extension field, the acknowledgment information and the indication information are carried in the BTH field, and the congestion information is carried in the extension field.

The extension field is, for example, a congestion extended transport header (CETH) described in this specification, so that the congestion information can be carried by using the extended CETH header.

For example, the CETH includes two parts: a standard definition and vendor defined information. The standard definition part may be used for compatible interconnection in a hybrid networking scenario. The standard definition part may include the following fields: a version number (Ver) and a CETH header length (Length).

The vendor defined information field is used to support congestion notification information defined by various vendors. For example, a total length of the CETH is (Length*4−1) bytes. For example, a vendor may design at least one of the following information: a congestion degree, a congestion location, a packet queue length, and a network delay that are of a bearer network path. For example, the congestion degree of the network path may be represented by a 2-bit ratio field, and the ratio field is used to identify the congestion degree. In an application scenario, a ratio field may indicate a congestion degree based on a level, for example, no congestion, slight congestion, moderate congestion, or severe congestion. In addition, more other content may be designed for the vendor defined information. For example, a 1-bit field is designed to indicate whether a current congestion notification is of a common CNP type or an enhanced CNP type. For another example, a 4-bit field may be designed to identify a service scenario, for example, an Reliable Connected (RC)/Extended Reliable Connected (XRC) write/send scenario, an RC/XRC read response scenario, or a Unreliable Datagram (UD) send scenario.

The Ver field indicates a CETH version number. For example, the Ver field may occupy 4 bits, and is used to support upgrading of a congestion control algorithm and compatible interconnection.

The Length field indicates a length of the CETH header. For example, the Length field occupies 4 bits, and supports a variable length of the CETH header to reduce fixed overheads.

It can be learned that, by designing the extension field CETH, not only it can be ensured that the congestion information is carried without occupying space of an existing field, but also the CETH can be used for compatible interconnection in a hybrid networking scenario and used to support congestion notification information defined by various vendors, thereby helping to satisfy requirements of different vendors.

Based on the first aspect, in a possible embodiment, the acknowledgment packet further includes a BTH field, and the acknowledgment information, the indication information, and the congestion information are all carried in the BTH field.

For example, in an implementation, a reserved field "reserved 6" in a BTH in a standard ACK may be used to carry the congestion information in this embodiment of the present disclosure. In other words, "reserved 6" is used as a first CETH to carry related data. This implements aggregation of congestion control information and transmission acknowledgment information.

For another example, in an implementation, a reserved field "reserved 7" in a BTH in a standard ACK may be used to carry the congestion information in this embodiment of the present disclosure. In other words, "reserved 7" is used as a second CETH to carry related data. This implements aggregation of congestion control information and transmission acknowledgment information.

In this embodiment, the indication information and the congestion information may be integrated into the field in the acknowledgment packet. In this case, the acknowledgment packet may be considered as an improvement of a conventional ACK packet, and space in the existing field is fully utilized to carry the congestion information. This fully utilizes space in the field in the acknowledgment packet, and avoids changing of an existing packet format.

Based on the first aspect, in a possible embodiment, when the indication information indicates that the network path is not congested, that the first network device performs congestion control based on the acknowledgment packet includes: The first network device keeps the sending rate of the first network device unchanged. For example, the first network device maintains a relatively high sending rate. In this way, packet transmission efficiency is improved.

Based on the first aspect, in a possible embodiment, when the indication information indicates that the network path is not congested, that the first network device performs congestion control based on the acknowledgment packet includes: The first network device sets the sending rate of the first network device to a preset rate. For example, the first network device adjusts the sending rate of the first network device from a low sending rate (for example, the low sending rate is designed when network congestion occurs) to a relatively high sending rate (for example, the high sending rate is designed when no network congestion occurs), to improve restoration efficiency of the sending rate and reduce a packet sending delay.

Based on the first aspect, in a possible embodiment, the indication information may be an indication bit, an indication field, an indication identifier, or the like.

For example, when the indication information is an indication bit, and a value of the indication bit is 0, it means that the destination end device indicates, to the RNIC in the source end device, that no network congestion occurs in the current network path, and the acknowledgment packet does not carry congestion information; and when a value of the indication bit is 1, it means that the destination end device indicates, to the RNIC in the source end device, that network congestion occurs in the current network path, and the acknowledgment packet carries congestion information.

For another example, a function of the indication information may be redefined by using an existing field. For example, the indication information may be a BTH backward explicit congestion notification (BTH.BECN) field in the acknowledgment packet. When the BTH.BECN field is 0, it means that the destination end device indicates, to the RNIC in the source end device, that no network congestion occurs in the current network path, and the acknowledgment packet does not carry congestion information; and when the BTH.BECN field is 1, it means that the destination end device indicates, to the RNIC in the source end device, that network congestion occurs in the current network path, and the acknowledgment packet carries congestion information.

According to a second aspect, the present disclosure provides a RoCE network congestion control method. The method includes a second network device receives a RoCE protocol packet from a first network device; the second network device checks whether the RoCE protocol packet carries an explicit congestion notification; the second network device generates an acknowledgment packet based on a checking result, where the acknowledgment packet includes indication information and acknowledgment information that is specific to the RoCE protocol packet, and the indication information indicates whether a network path between the first network device and the second network device is congested; and the second network device sends the acknowledgment packet to the first network device, where the acknowledgment packet is used by the first network device to perform congestion control.

It can be learned that, during implementation of this embodiment of the present disclosure, a destination end device may analyze, by using the second network device, whether the RoCE protocol packet carries an explicit congestion notification, and then return the acknowledgment information packet in which the indication information is aggregated, where the indication information is used to notify the first network device whether network congestion occurs in the current network path. In this way, the first network device can obtain a status of a current network, that is, whether the current network is congested or not congested, so that the first network device can perform a corresponding congestion control operation based on the status of the current network. For example, when the network is not congested, the first network device can maintain or restore to a high sending rate in time. Therefore, the indication information and the acknowledgment information to avoid a disadvantage in a conventional solution that an independent CNP needs to be sent, thereby reducing notification overheads, helping to reduce a congestion notification delay in a large-traffic scenario, and increasing a response speed of the destination end device. In addition, a source end device can immediately learn of a network congestion status based on the indication information, to trigger congestion control earlier to adjust a sending rate, thereby increasing a response speed of the source end device. When network congestion is eliminated, the source end device can also learn, based on the indication information, that network congestion is eliminated, and restore a sending rate in time, thereby improving utilization of network bandwidth.

Based on the second aspect, in a possible embodiment, when the indication information indicates that the network path is congested, the acknowledgment packet further includes congestion information, and the congestion information further includes at least one of the following information: a congestion degree, a congestion location, a packet queue length, and a network delay that are of the network path; and the congestion information is used by the first network device to perform congestion control. This helps the first network device perform diversified, differentiated, and specific congestion control based on detailed congestion information, for example, adjusting sending rates of different levels, or implementing diversified adjustment of a quantity of packets, a sending time, and the like, thereby greatly improving a congestion control effect.

Based on the second aspect, in a possible embodiment, the congestion degree is one of congestion degrees at a plurality of different levels, and the congestion degrees at the different levels correspond to different sending rates of the first network device.

Based on the second aspect, in a possible embodiment, before the second network device generates the acknowledgment packet based on the checking result, the method further includes: The second network device generates the congestion information.

For example, when a current network is congested, the second network device may obtain, through packet detection or hardware detection, network status information, for example, information in different dimensions such as a congestion degree, a congestion location, a queue depth, and a network delay.

Based on the second aspect, in a possible embodiment, when the congestion information includes the congestion degree, the second network device may obtain the congestion degree in the following manners:

(1) The second network device determines the congestion degree of the network path based on a proportion of ROCE protocol packets that are in a historical packet receiving record and that carry an explicit congestion notification. For example, the second network device periodically performs window sliding to obtain a proportion of received packets carrying an ECN flag, to calculate a specific congestion degree of the current network path.

(2) The congestion degree is obtained in an inband network telemetry (INT) manner or in an in-situ operation, administration, and maintenance (IOAM) manner. The INT manner is used as an example. A range supported by INT may be extended to a network interface card of a server, and the network interface card may receive measurement information that is of a switch and that is inserted into a data packet. A current network status may be obtained through calculation based on the information. For example, the network delay is calculated by using a timestamp, and the congestion degree is calculated by using a queue length and a queue occupancy rate.

Based on the second aspect, in a possible embodiment, the acknowledgment packet further includes a BTH field and an extension field, the acknowledgment information and the indication information are carried in the BTH field, and the congestion information is carried in the extension field. The extension field is, for example, a CETH described in this specification, so that the congestion information can be carried by using the extended CETH header.

By designing the extension field CETH, not only it can be ensured that the congestion information is carried without occupying space of an existing field, but also the CETH can be used for compatible interconnection in a hybrid networking scenario and used to support congestion notification information defined by various vendors, thereby helping to satisfy requirements of different vendors.

Based on the second aspect, in a possible embodiment, the acknowledgment packet further includes a BTH field, and the acknowledgment information, the indication information, and the congestion information are all carried in the BTH field.

The indication information and the congestion information are integrated into the field in the acknowledgment packet. In this case, space in an existing field is fully utilized to carry the congestion information. This fully utilizes space in the field in the acknowledgment packet, and avoids changing of an existing packet format.

According to a third aspect, an embodiment of the present disclosure provides an apparatus. The apparatus is applied to a first network device, and includes: a packet sending module configured to send a RoCE protocol packet to a second network device; a packet receiving module configured to receive an acknowledgment packet from the second network device, where the acknowledgment packet includes indication information and acknowledgment information that is specific to the ROCE protocol packet, and the indication information indicates whether a network path between the first network device and the second network device is congested; and a congestion control module configured to perform congestion control based on the acknowledgment packet.

The function modules of the apparatus are specifically configured to implement the steps in the method described in the first aspect.

Based on the third aspect, in a possible embodiment, when the indication information indicates that the network path is congested, the acknowledgment packet further includes congestion information, and the congestion information further includes at least one of the following information: a congestion degree, a congestion location, a packet queue length, and a network delay that are of the network path; and the congestion control module is specifically configured to perform congestion control based on the congestion information.

Based on the third aspect, in a possible embodiment, the congestion control module is specifically configured to adjust a sending rate of the first network device based on the congestion degree, where there is a correspondence between the congestion degree and the sending rate; determine a quantity of to-be-sent packets in a next time window based on at least one of the congestion location and the packet queue depth; or adjust a sending rate of the first network device based on the network delay or determine a quantity of to-be-sent packets in a next time window based on the network delay.

Based on the third aspect, in a possible embodiment, the congestion degree is one of congestion degrees at a plurality of different levels, and the congestion degrees at the different levels correspond to different sending rates.

Based on the third aspect, in a possible embodiment, the acknowledgment packet further includes a BTH field and an extension field, the acknowledgment information and the indication information are carried in the BTH field, and the congestion information is carried in the extension field.

Based on the third aspect, in a possible embodiment, the acknowledgment packet further includes a BTH field, and the acknowledgment information, the indication information, and the congestion information are all carried in the BTH field.

Based on the third aspect, in a possible embodiment, the congestion control module is specifically configured to: when the indication information indicates that the network path is not congested, keep the sending rate of the first network device unchanged.

Based on the third aspect, in a possible embodiment, the congestion control module is specifically configured to: when the indication information indicates that the network path is not congested, set the sending rate of the first network device to a preset rate.

According to a fourth aspect, the present disclosure provides an apparatus. The apparatus is applied to a second network device, and includes: a packet receiving module configured to receive a RoCE protocol packet from a first network device; a congestion information determining module configured to check whether the ROCE protocol packet carries an explicit congestion notification; and an aggregated-notification sending module configured to generate an acknowledgment packet based on a checking result, where the acknowledgment packet includes indication information and acknowledgment information that is specific to the ROCE protocol packet, and the indication information indicates whether a network path between the first network device and the second network device is congested. The aggregated-notification sending module is further configured to send the acknowledgment packet to the first network device, where the acknowledgment packet is used by the first network device to perform congestion control.

The function modules of the apparatus are specifically configured to implement the steps in the method described in the second aspect.

Based on the fourth aspect, in a possible embodiment, when the indication information indicates that the network path is congested, the acknowledgment packet further includes congestion information; the congestion information further includes at least one of the following information: a congestion degree, a congestion location, a packet queue length, and a network delay that are of the network path; and the congestion information is used by the first network device to perform congestion control.

Based on the fourth aspect, in a possible embodiment, the congestion degree is one of congestion degrees at a plurality of different levels, and the congestion degrees at the different levels correspond to different sending rates of the first network device.

Based on the fourth aspect, in a possible embodiment, the congestion information determining module is further configured to generate the congestion information.

Based on the fourth aspect, in a possible embodiment, when the congestion information includes the congestion degree, the congestion information determining module is specifically configured to determine the congestion degree based on a proportion of ROCE protocol packets that are in a historical packet receiving record and that carry an explicit congestion notification; obtain the congestion degree in an INT manner; or obtain the congestion degree in an IOAM manner.

Based on the fourth aspect, in a possible embodiment, the acknowledgment packet further includes a BTH field and an extension field, the acknowledgment information and the indication information are carried in the BTH field, and the congestion information is carried in the extension field.

Based on the fourth aspect, in a possible embodiment, the acknowledgment packet further includes a BTH field, and the acknowledgment information, the indication information, and the congestion information are all carried in the BTH field.

According to a fifth aspect, the present disclosure provides a device. The device includes a host system and a first network device, the host system is configured to interact with the first network device to implement data transmission, and the first network device is configured to perform the method described in any embodiment of the first aspect.

According to a sixth aspect, the present disclosure provides a device. The device includes a host system and a second network device, the host system is configured to interact with the second network device to implement data transmission, and the second network device is configured to perform the method described in any embodiment of the second aspect.

According to a seventh aspect, the present disclosure provides a first network device. The first network device may include a controller, a register, a communication interface, and a logical operation component, and these components may be electrically connected to each other by using one or more internal buses. The first network device implements the method described in any embodiment of the first aspect through cooperation between the components.

According to an eighth aspect, the present disclosure provides a second network device. The second network device may include a controller, a register, a communication interface, and a logical operation component, and these components may be electrically connected to each other by using one or more internal buses. The second network device implements the method described in any embodiment of the second aspect through cooperation between the components.

According to a ninth aspect, an embodiment of the present disclosure provides a chip. The chip includes a processor and a data interface, and the processor reads, through the data interface, instructions stored in a memory, to perform the method described in any embodiment of the first aspect or the second aspect.

According to a tenth aspect, an embodiment of the present disclosure provides a non-volatile computer-readable storage medium. The computer-readable storage medium is configured to store implementation code of the method described in any embodiment of the first aspect or the second aspect. When the program code is executed by a device, the method described in any embodiment of the first aspect or the second aspect can be implemented.

According to an eleventh aspect, an embodiment of the present disclosure provides a computer program product. The computer program product includes program instructions. When the computer program product is executed by a device, the method described in any embodiment of the first aspect or the second aspect is performed. The computer program product may be a software installation package. The computer program product may be downloaded, and the computer program product may be executed on a controller to implement the method described in any embodiment of the first aspect or the second aspect.

It can be learned that, during implementation of embodiments of the present disclosure, when a RoCE protocol packet carries an ECN flag, the second network device in the destination end device may return an acknowledgment information packet in which a CETH and indication information are aggregated, where the indication information is used to notify the source end device that network congestion occurs in the current network path, and the CETH is used to provide detailed congestion information to the source end device. In this way, the first network device in the source end device extracts the congestion information from the CETH to perform quantitative and diversified congestion control operations. When a RoCE protocol packet does not carry an ECN flag, the destination end device may return an acknowledgment packet, and notify the source end device that no network congestion occurs in the current network path, so that the source end device maintains or restores to a high sending rate in time.

In this way, the indication information, the congestion information, and the acknowledgment information to avoid sending of an independent CNP, thereby reducing notification overheads, helping to reduce a congestion notification delay in a large-traffic scenario, and increasing a response speed of the destination end device.

In addition, the source end device can immediately learn of a network congestion status based on the indication information, to trigger congestion control earlier to adjust a sending rate, thereby increasing a response speed of the source end device. When network congestion is eliminated, the source end device can also learn, based on the indication information, that network congestion is eliminated, and restore a sending rate in time, thereby improving utilization of network bandwidth.

Finally, during existing RDMA network congestion control, there is a small amount of notification information, and a convergence speed during network congestion control is low. In contrast, in the present disclosure, the CETH is used to carry the detailed congestion information of the network, for example, information in different dimensions such as a congestion degree, a congestion location, a queue depth, and a network delay. This helps the source end device adjust the sending rate to a target rate in one step based on the detailed congestion information, to implement fast convergence and diversified adjustment of a quantity of packets, a sending time, and the like, thereby greatly improving a congestion control effect.

DESCRIPTION OF EMBODIMENTS

The following describes embodiments of the present disclosure with reference to the accompanying drawings in embodiments of the present disclosure. The terms "a" and "the" of singular forms used in embodiments and the appended claims of the present disclosure are also intended to include plural forms, unless otherwise specified in the context clearly. It should be further understood that the term "and/or" used in this specification indicates and includes any or all possible combinations of one or more associated listed items. It should be noted that, when used in this specification and the appended claims, the terms "include" and any variants thereof mean to cover the non-exclusive inclusion. For example, a system, product, or apparatus that includes a series of units/devices is not limited to listed units/devices, but may optionally further include units/devices that are not listed, or optionally further include other units/devices inherent to such a product or apparatus.

It should also be noted that, the terms "first", "second", "third", and the like in this specification and the claims are intended to distinguish between different objects, but are not intended to describe a specific order or a specific meaning.

Terms used in implementations of the present disclosure are merely intended to explain specific embodiments of the present disclosure, and are not intended to limit the present disclosure.

First, a system architecture applied to embodiments of the present disclosure is described.

Figure 1:
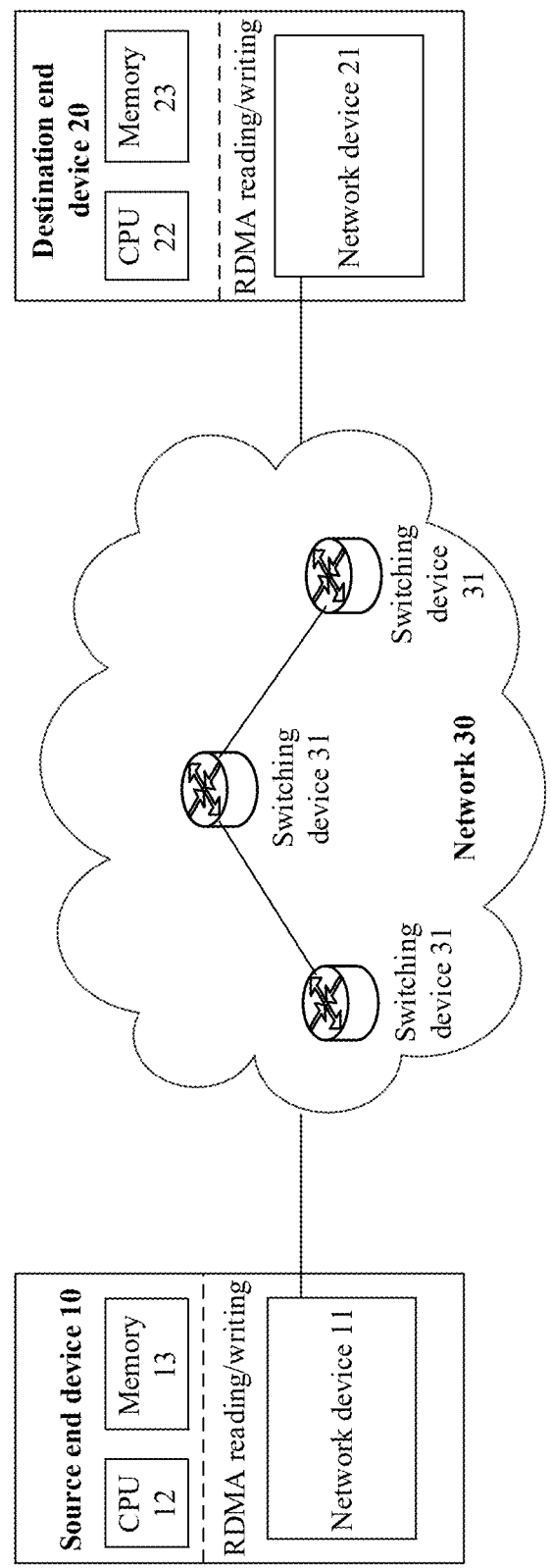
FIG. 1 is a schematic diagram of a system architecture according to an embodiment of the present disclosure.

FIG. 1 is a schematic diagram of a system architecture according to an embodiment of the present disclosure. As shown in FIG. 1, the system architecture includes a source end device 10 and a destination end device 20. The source end device 10 and the destination end device 20 are communicatively connected through a network 30. Both the source end device 10 and the destination end device 20 support ROCE protocol-based network communication. The source end device 10 and the destination end device 20 each may be a computing device such as a computer, a desktop computer, a notebook computer, a server, or a terminal.

The network 30 may include a plurality of switching devices 31, and the plurality of switching devices 31 may be configured to perform packet forwarding and transmission, network traffic detection, and the like between the source end device 10 and the destination end device 20, to implement communication interaction between the source end device 10 and the destination end device 20. The switching device 31 may be, for example, a switch, a router, a relay device, or a gateway device.

The source end device 10 and the destination end device 20 each may include a network device and a host system, and the host system includes a host CPU and a memory. For example, in FIG. 1, the source end device 10 includes a CPU 12, a memory 13, and a network device 11, and connections between these components may be established by using a bus; and the destination end device 20 includes a CPU 22, a memory 23, and a network device 21, and connections between these components may be established by using a bus.

In this embodiment of the present disclosure, the network device is a piece of hardware designed to allow a computing device to perform communication in a network. The network device may specifically be a network interface controller (NIC) configured to implement communication between a device and the network. The NIC may also be referred to as a network adapter, a network interface card, or a LAN adapter. In this embodiment of the present disclosure, the network device supports the RDMA protocol. Therefore, the NIC may also be referred to as an RNIC (RDMA NIC). In this specification, the RNIC is used as an example to describe solutions.

As shown in FIG. 1, the network device 11 and the network device 21 are connected to each other through the network 30 to implement communication between the source end device 10 and the destination end device 20. Both the network device 11 and the network device 21 support the ROCE protocol. When the source end device 10 initiates an RDMA read/write request to the destination end device 20 through the network, the network device 11 and the network device 21 directly write, into the memory 23 from the memory 13, data that needs to be written, or directly write, from the memory 23 into the memory 13, data that needs to be read.

For the host system of each of the source end device 10 and the destination end device 20, there may be one or more CPUs in the host systems, and types of the CPUs may be different or the same. A CPU may include one or more processor cores, or a plurality of CPUs may be integrated as a multi-core processor. The host system may run, by using the CPU, various software components such as an operating system and an application program running on the operating system. A user may initiate service communication by using the operating system or the application program, to implement communication interaction between the source end device 10 and the destination end device 20 by using the network devices.

The memory in the host system may be configured to store computer instructions and data, and the memory may also store data, a packet, and the like that are read or written through RDMA. The memory may be any one or any combination of the following storage media: a storage class memory (SCM), a read-only memory (ROM), a random-access memory (RAM), or a cache.

In the system architecture, remote access between two computing devices is implemented by RNICs in the computing devices. RNICs supporting the ROCE protocol and a network including switching devices jointly form a RoCE network. The solutions in the present disclosure are applied to the ROCE network. A method described in embodiments of the present disclosure may be implemented in an RNIC network interface card, and is used to implement congestion control in the RoCE network.

Although roles of the two computing devices are divided into a source end device and a destination end device, it should be understood that "source end device" and "destination end device" are two relative concepts.

The source end device is a computing device that initiates an RDMA request, that is, a computing device that requests to access another computing device.

The destination end device is a computing device that receives an RDMA request, that is, a computing device that is accessed by another computing device.

For example, access by the source end device to the destination end device may be that the source end device writes data into the destination end device. Specifically, the source end device transmits data in the source end device to the RNIC in the destination end device by using the RNIC in the source end device. The destination end device receives the data by using the RNIC in the destination end device, to transmit the data in the source end device to the destination end device. Access by the source end device to the destination end device may alternatively be that the source end device reads data from the destination end device. Specifically, the source end device may read data in a memory of the destination end device by using the RNIC in the source end device, the destination end device sends, to the RNIC in the source end device by using the RNIC in the destination end device, the data to be read by the source end device, and the RNIC in the source end device receives the data to complete reading of the data in the destination end device.

In this embodiment of the present disclosure, data for communication between the source end device and the destination end device is mainly carried in a form of a packet. In this specification, a packet supporting the ROCE protocol may be referred to as a RoCE protocol packet or a RoCE data packet for short. Generally, when a packet sent by the source end device 10 to the destination end device 20 is successfully received by the destination end device, the destination end device needs to return an acknowledgment packet to notify the source end device that the packet is successfully received. The technical solutions in embodiments of the present disclosure are mainly used for optimizing this process.

It should be noted that, FIG. 1 is merely used to describe the technical solutions provided in embodiments of the present disclosure, and shows the foregoing components and connection relationships therebetween. During specific implementation, the source end device 10 and the destination end device 20 shown in FIG. 1 each may further include a component other than the foregoing components. For example, the source end device 10 and the destination end device 20 shown in FIG. 1 each may further include a hardware resource such as a hard disk. Details are not described herein.

Figure 2:
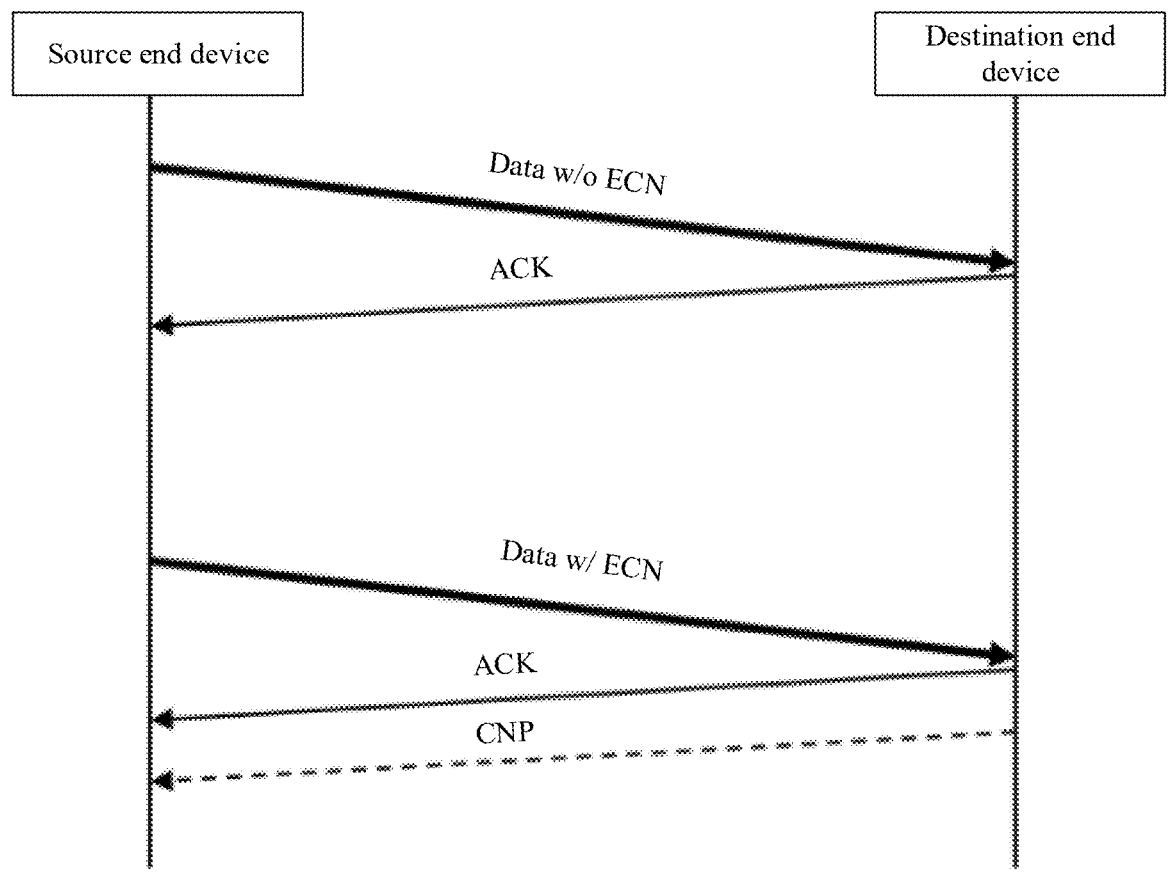
FIG. 2 is a scenario diagram of a communication process between existing devices that support the RoCE protocol.

FIG. 2 shows a communication process between existing devices that support the ROCE protocol. The ROCE protocol is one of RDMA protocols. The RDMA protocols are transport layer protocols, and the ROCE protocol is a protocol that additionally includes a network layer and a link layer. The ROCE protocol also supports a reliable connection service. A protocol packet sent by a source end device carries a packet sequence number (PSN). After receiving the protocol packet, a destination end device returns an acknowledgment packet to the source end device to notify an RNIC in the source end device that the packet sent by the source end device has been successfully transmitted. When congestion occurs due to excessively large traffic in a network, a CP device in the network performs RED ECN marking on a packet. When receiving the packet carrying an ECN flag, according to a stipulation in the protocol, the destination end device returns an acknowledgment packet to the source end device, and also sends an independent CNP packet to the source end device to notify that network congestion occurs. The CNP packet is only defined as a signal, and does not carry any status information. In addition, after the destination end device returns both the acknowledgment packet and the CNP packet, the RNIC in the source end device also needs to process the two packets.

Figure 3:
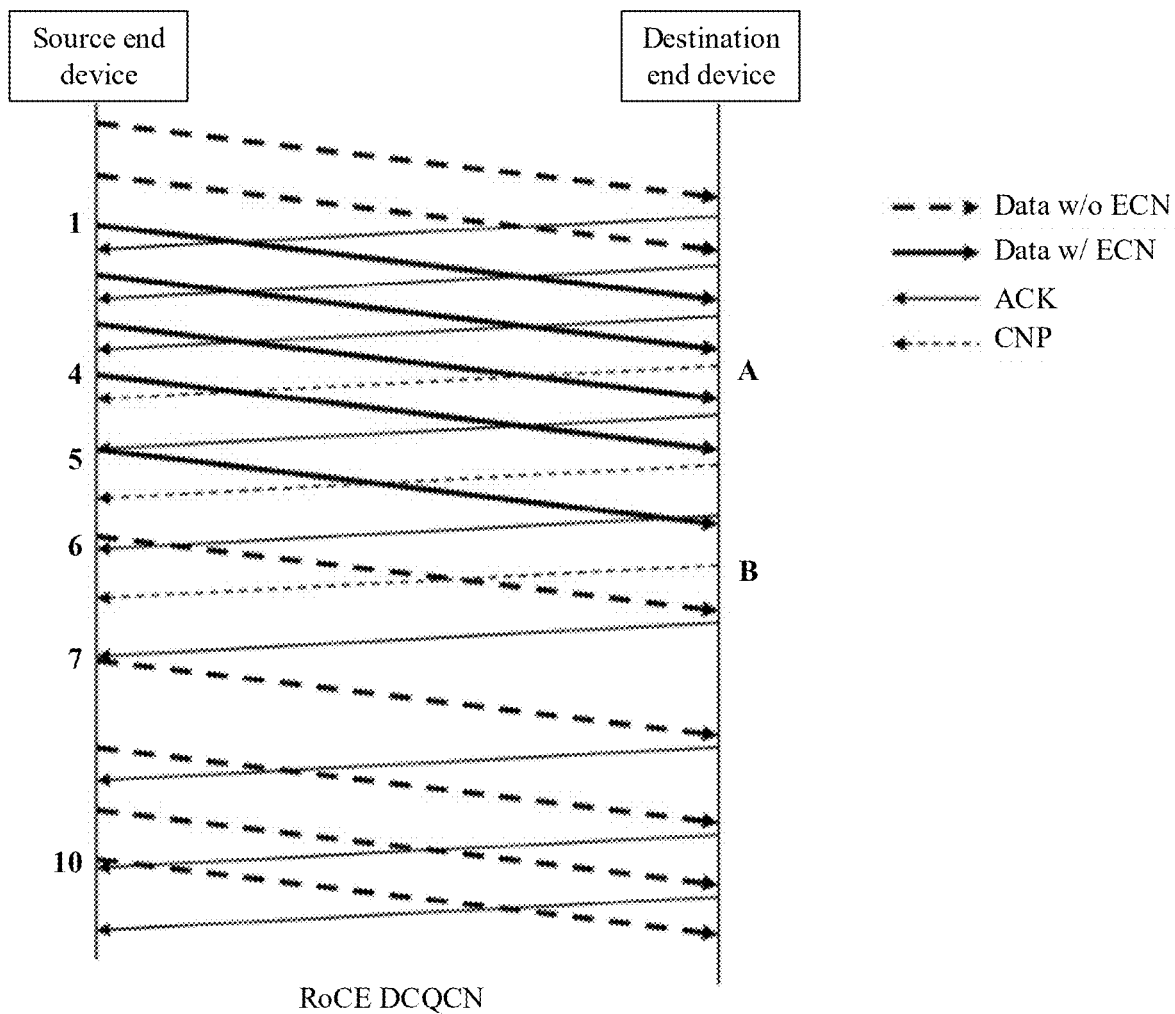
FIG. 3 is a scenario diagram of a device communication process in a scenario in which there is large traffic in a network.

FIG. 3 shows an example of a device communication process in a scenario in which there is large traffic in a network. As shown in FIG. 3, network congestion occurs during forwarding of a data packet 1. However, due to a limitation on a transmission capability of a destination end device, sending the first CNP packet, that is, a CNP packet A by the destination end device is delayed. As a result, a source end device does not start to reduce a rate until the source end device sends a protocol packet 5. Before that, a network congestion degree is increasing because the sending rate is not reduced in time. Network congestion is eliminated during transmission of a protocol packet 6. However, because notification of a CNP packet is delayed, the source end device keeps decreasing the rate until the source end device sends a protocol packet 7. An excessively large decrease in the rate affects utilization of network bandwidth. After sending a CNP packet B, the destination end device does not notify any longer that network congestion occurs, but the source end device cannot obtain congestion elimination information in time. The source end device can slowly increase a rate only after a time period expires, and restores to a target sending rate when the source end device sends a protocol packet 10. During this period, utilization of the network bandwidth is low.

It can be learned from the foregoing that, in the existing solutions, because a packet sending rate of a network interface card has an upper limit, after network congestion occurs, a network interface card of the destination end device needs to continuously send acknowledgment packets and CNP packets. When network traffic pressure increases, there is a delay in returning the acknowledgment packets and the CNP packets, resulting in a response delay of rate control. In addition, a CNP can only be used to notify that congestion occurs but cannot be used to notify that congestion is eliminated. Whether congestion is eliminated can only be periodically detected by a transmit end. Due to an increase in an ACK delay, a quantity of packets in flight that is obtained through statistics collection is larger than that of actual packets in flight. A delay of the CNP packet results in a low congestion control response speed of the source end device, and consequently rate control cannot be implemented in time.

In addition, in the ROCE protocol, a CNP packet is used to notify that network congestion occurs. The CNP packet can only be used to notify that network congestion occurs but cannot be used to notify a specific network congestion status. Consequently, the transmit end cannot implement efficient congestion control, but a rate of the transmit end can only slowly reach a target rate step by step, leading to slow network convergence and low bandwidth utilization.

Figure 4:
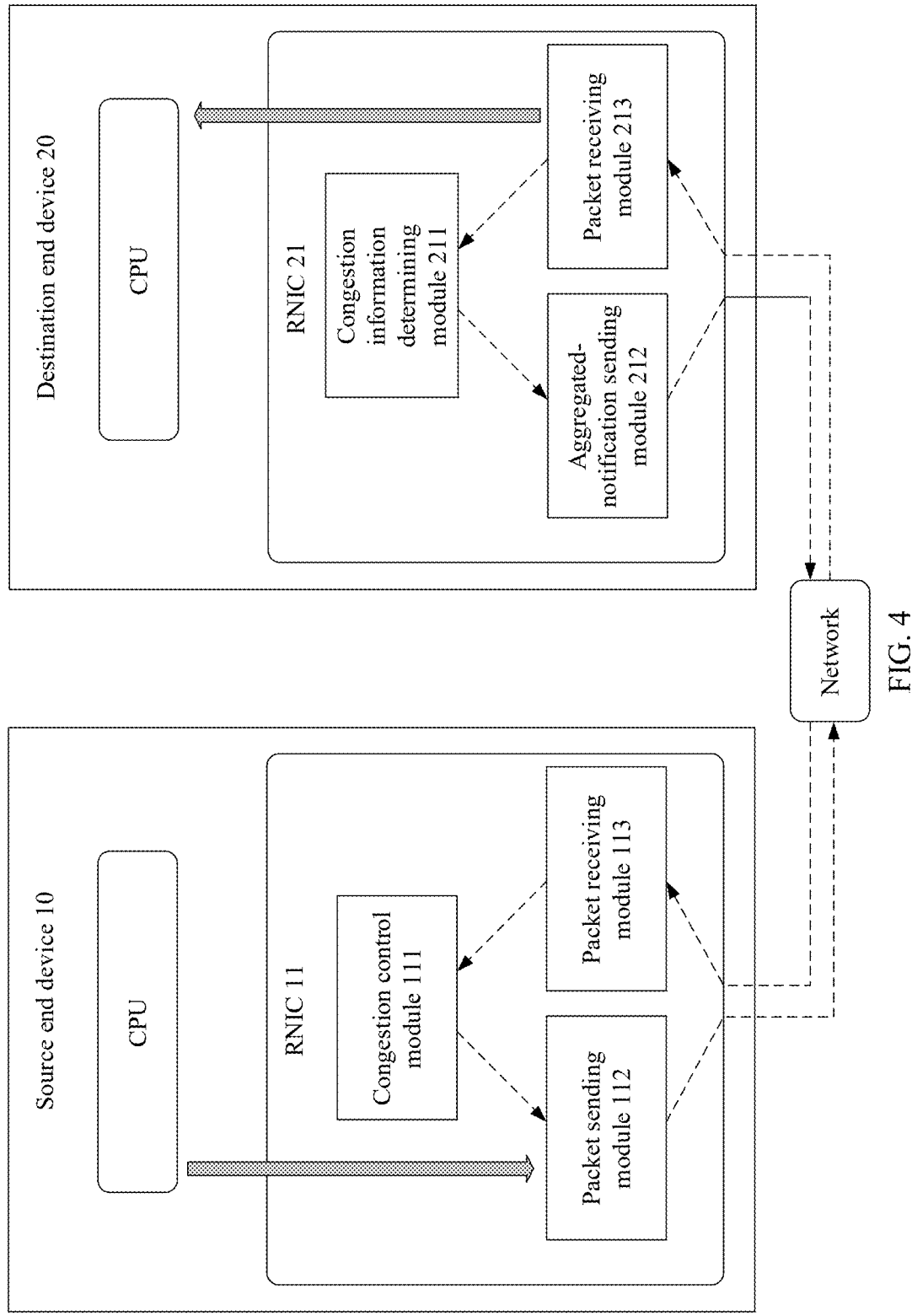
FIG. 4 is a schematic diagram of a system architecture including function modules according to an embodiment of the present disclosure.

In embodiments of the present disclosure, RNICs in the source end device and the destination end device are improved to resolve some or all of the defects mentioned in the foregoing existing solutions. FIG. 4 shows a specific system architecture according to an embodiment of the present disclosure. In the system architecture, a related function module is configured in each of RNICs in a source end device 10 and a destination end device 20, to support implementation of the solutions in the present disclosure. As shown in FIG. 4, a network device of the source end device 10 is an RNIC 11, a network device of the destination end device 20 is an RNIC 21, and a congestion control module 111, a packet sending module 112, and a packet receiving module 113 are configured in the RNIC 11. A congestion information determining module 211, an aggregated-notification sending module 212, and a packet receiving module 213 are configured in the RNIC 21. A specific description is as follows:

The packet sending module 112 is configured to send a RoCE protocol packet to the destination end device 20.

The packet receiving module 113 is configured to receive an acknowledgment packet from the destination end device 20. The acknowledgment packet is an aggregated packet designed in this embodiment of the present disclosure. Indication information and acknowledgment information that is specific to the RoCE protocol packet may be aggregated in the acknowledgment packet, and the indication information indicates whether a network path between the source end device 10 and the destination end device 20 is congested. When the network path is congested, congestion information is further aggregated in the acknowledgment packet, and the congestion information further includes at least one of the following information: a congestion degree, a congestion location, a packet queue length, and a network delay that are of the network path. In other words, the acknowledgment packet carries indication information indicating that network congestion occurs, and also carries specific status information of network congestion. Specific implementation of the acknowledgment packet is described in detail in the following description.

The congestion control module 111 is configured to perform quantifiable congestion control based on the acknowledgment packet. In this embodiment of the present disclosure, congestion control is a function used to adjust a quantity of packets sent through a transmission control protocol (ROCE protocol) connection in one period (a quantity of packets sent in one period). The quantity of packets sent in one period and sending frequency can be quantitatively increased or decreased through congestion control, so that an adjusted quantity of packets sent in one period and adjusted sending frequency are close to a most suitable bearing capability of a current network.

The packet receiving module 213 is configured to receive the ROCE protocol packet from the source end device 10.

The congestion information determining module 211 is configured to check whether the ROCE protocol packet carries an explicit congestion notification. If the ROCE protocol packet carries an explicit congestion notification, the congestion information determining module 211 may be configured to generate the congestion information. The congestion information further includes at least one of the following information: the congestion degree, the congestion location, the packet queue length, and the network delay that are of the network path, and the congestion information is used to support the source end device in performing quantitative congestion control.

The aggregated-notification sending module 212 may be configured to generate an acknowledgment packet based on a checking result of the packet. The acknowledgment packet is the aggregated packet designed in this embodiment of the present disclosure. The aggregated-notification sending module 212 is further configured to send the acknowledgment packet to the source end device 10, so that the source end device 10 implements quantitative congestion control.

Figure 5:
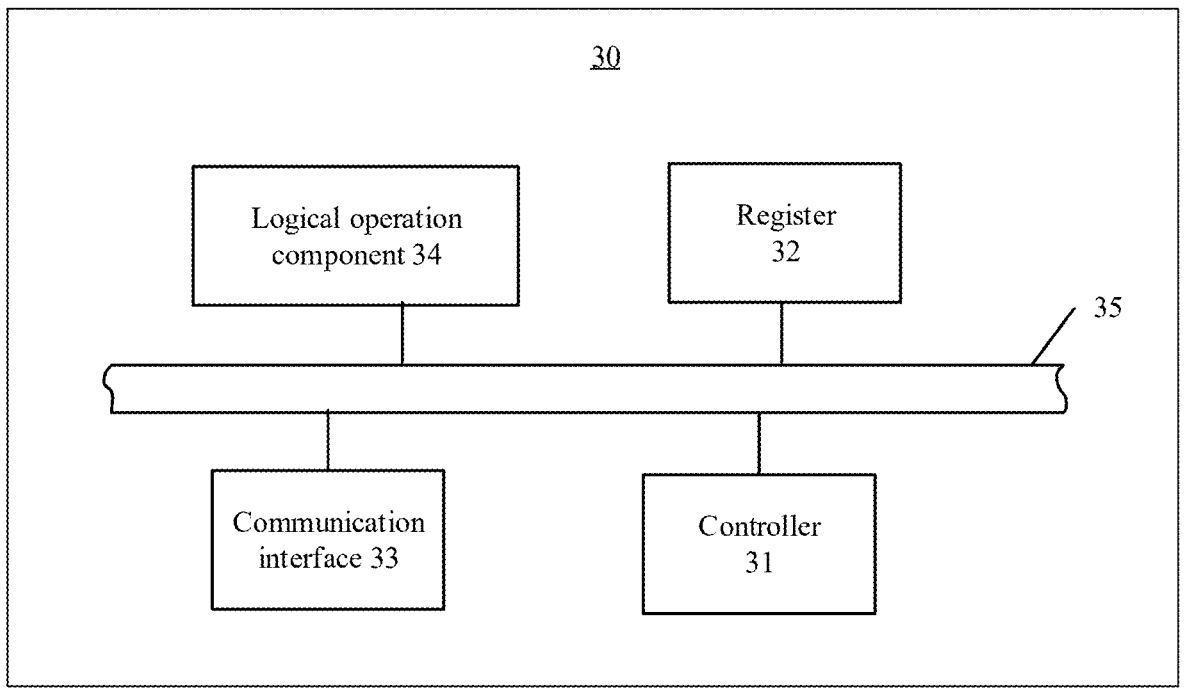
FIG. 5 is a schematic diagram of a hardware structure of a network device according to an embodiment of the present disclosure.

The foregoing function modules of the RNICs in the source end device and the destination end device may be implemented through mutual cooperation of software and hardware structures of respective RNICs. FIG. 5 shows an example RNIC hardware structure 30. The RNIC hardware structure 30 may be a structure of an RNIC in a source end device, or may be a structure of an RNIC in a destination end device. In specific implementation, the RNIC hardware structure 30 may be an independent standard network interface card (for example, a network interface card of a Peripheral Component Interconnect Express (PCIe) interface). Alternatively, the RNIC hardware structure 30 may be an integrated network interface card integrated into a system-on-a-chip (SoC) chip, and may be obtained by upgrading hardware of an existing RNIC network interface card (for example, an application-specific integrated circuit (ASIC) chip or firmware (FW)), to support the solutions mentioned in embodiments of the present disclosure.

As shown in FIG. 5, the RNIC hardware structure 30 may include a controller 31, a register 32, a communication interface 33, and a logical operation component 34. These components may be electrically connected to each other by using one or more internal buses 35.

The register 32 is a memory with relatively small storage space, and the register 32 may be configured to store various instructions. The register 32 may be further configured to store a register operand temporarily stored in an instruction execution process and an intermediate or final operation result. The register may be further configured to store data used by the logical operation component 34 to complete a task requested by the controller 31.

The controller 31 is configured to decode the instructions stored in the register, and send a control signal corresponding to each operation to be performed to complete each instruction. The controller 31 is a processor core that can run a program. For example, the controller 31 may be implemented by a SoC, a field-programmable gate array (FPGA), an ASIC, or another circuit apparatus. For another example, the controller 31 may include various AND-OR gate arrays. For example, a control manner of the controller 31 may be a microprogram control manner, where a microprogram may be stored in the register 32; or may be a hardware control manner in which a logical hard-wired structure is mainly used. This is not limited in the present disclosure.

The logical operation component 34 may be configured to execute an operation command, for example, an addition command, a subtraction command, a multiplication command, or a division command. The logical operation component 34 may be further configured to obtain a logical command, for example, an OR logic command, an AND logic command, a NOT logic command. The logical operation component 34 may be further configured to: obtain the control signal from the controller 31, obtain, from the register 32 based on the obtained control signal, data corresponding to the control signal, and perform a corresponding operation.

The communication interface 33 is configured to send or receive data. There may be a plurality of communication interfaces 33, and the communication interfaces 33 may be configured to receive data sent by a processor or send data to a CPU of a host system, or configured to receive data sent by an external computing device or send data to an external computing device (for example configured to send or receive a RoCE protocol packet or an aggregated acknowledgment packet).

Optionally, the RNIC may further include a crystal oscillator, a media access controller, a physical interface transceiver, and the like. This is not limited in this embodiment of the present disclosure.

In a specific embodiment, the controller 31 reads the instructions stored in the register, and sends the control signal corresponding to each operation to be performed to complete each instruction, to implement a RoCE network congestion control method described in any embodiment of this specification.

To better understand the implementation solutions in the present disclosure, the following describes in detail an acknowledgment packet that can be used to implement congestion notification aggregation and that is provided in embodiments of the present disclosure.

In embodiments of the present disclosure, an existing RoCE acknowledgment packet is extended to improve a congestion notification mechanism in the ROCE protocol and obtain an acknowledgment packet in the present disclosure. In this way, the acknowledgment packet may carry indication information indicating that network congestion occurs and congestion information, to implement congestion notification aggregation and accurately provide a network congestion notification.

Figure 6:
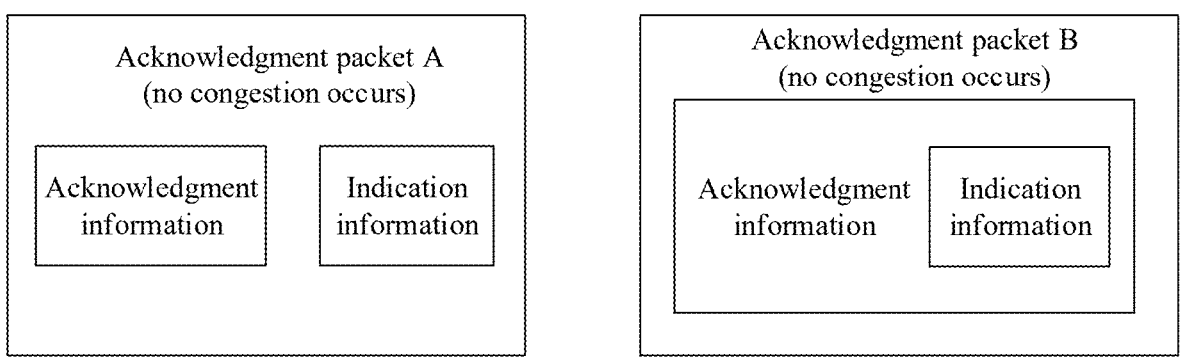
FIG. 6 is a schematic diagram of content of some possible acknowledgment packets according to an embodiment of the present disclosure.
Figure 7:
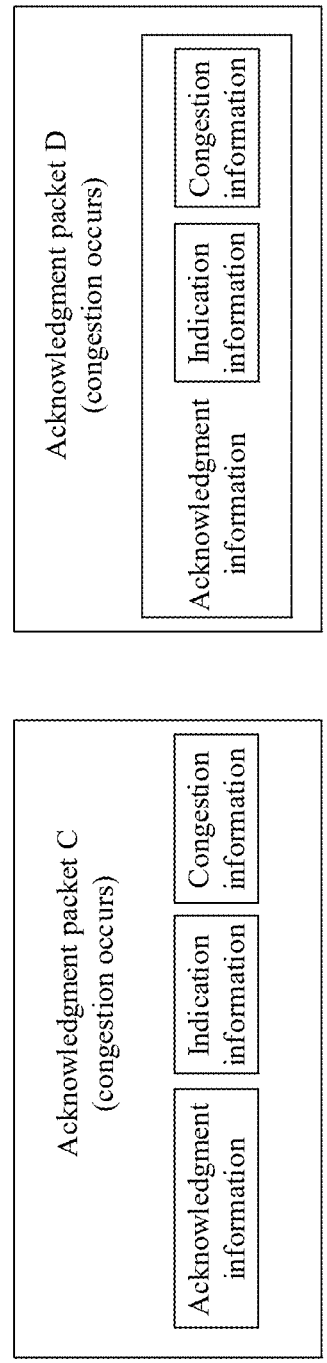
FIG. 7 is a schematic diagram of content of some other possible acknowledgment packets according to an embodiment of the present disclosure.

FIG. 6 and FIG. 7 show content of some possible acknowledgment packets in embodiments of the present disclosure. The acknowledgment packets may be generated by a destination end device and returned to a source end device.

FIG. 6 is a schematic diagram of two types of acknowledgment packets in a scenario in which no network congestion occurs (for example, a RoCE packet does not carry an ECN). An acknowledgment packet includes indication information and acknowledgment information that is specific to the ROCE protocol packet. The acknowledgment information can implement a function of an existing acknowledgment, that is, notifying an RNIC in the source end device whether the packet sent by the source end device has been successfully transmitted by the destination end device. The indication information indicates that a network path between the source end device and the destination end device is not congested.

As shown in FIG. 6, in an embodiment, the acknowledgment packet is implemented as an acknowledgment packet A. The acknowledgment information and the indication information in the acknowledgment packet A may be set at different locations in the packet, for example, may be distributed in different packet headers, to avoid changing of a field in the acknowledgment packet. In another embodiment, the acknowledgment packet is implemented as an acknowledgment packet B, and the indication information may be integrated into a field in the acknowledgment packet to fully utilize space in the field in the acknowledgment packet.

FIG. 7 is a schematic diagram of two types of acknowledgment packets in a scenario in which network congestion occurs (for example, a RoCE packet carries an ECN). An acknowledgment packet includes indication information, congestion information, and acknowledgment information that is specific to the ROCE protocol packet. The acknowledgment information can implement a function of an existing acknowledgment, that is, notifying the RNIC in the source end device whether the packet sent by the source end device has been successfully transmitted by the destination end device. The indication information indicates that the network path between the source end device and the destination end device is congested. The congestion information indicates a specific network status, and may specifically include at least one of the following information: a congestion degree, a congestion location, a packet queue length, and a network delay that are of the network path.

As shown in FIG. 7, in an embodiment, the acknowledgment packet is implemented as an acknowledgment packet C. The acknowledgment information, the indication information, and the congestion information in the acknowledgment packet C may be set at different locations in the packet, for example, may be distributed in different packet headers, to avoid changing of a field in the acknowledgment packet. In another embodiment, the acknowledgment packet is implemented as an acknowledgment packet D, and the indication information and/or the congestion information may be integrated into a field in the acknowledgment packet to fully utilize space in the field in the acknowledgment packet.

In this embodiment of the present disclosure, the indication information may be an indication bit, an indication field, an indication identifier, or the like.

For example, when the indication information is an indication bit, and a value of the indication bit is 0, it means that the destination end device indicates, to the RNIC in the source end device, that no network congestion occurs in the current network path, and the acknowledgment packet does not carry congestion information; and when a value of the indication bit is 1, it means that the destination end device indicates, to the RNIC in the source end device, that network congestion occurs in the current network path, and the acknowledgment packet carries congestion information.

For another example, a function of the indication information may be redefined by using an existing field. For example, the indication information may be a BTH.BECN field in the acknowledgment packet. When the BTH.BECN field is 0, it means that the destination end device indicates, to the RNIC in the source end device, that no network congestion occurs in the current network path, and the acknowledgment packet does not carry congestion information; and when the BTH.BECN field is 1, it means that the destination end device indicates, to the RNIC in the source end device, that network congestion occurs in the current network path, and the acknowledgment packet carries congestion information.

In this embodiment of the present disclosure, content of the congestion information may be carried by using a new defined packet header (for example, a CETH described below), and the congestion information can carry detailed content of a network congestion status, so that the destination end device accurately provides a network congestion notification to the source end device. Content of the congestion information may alternatively be carried by using space of an existing field, for example, an existing reserved field.

Figure 8:
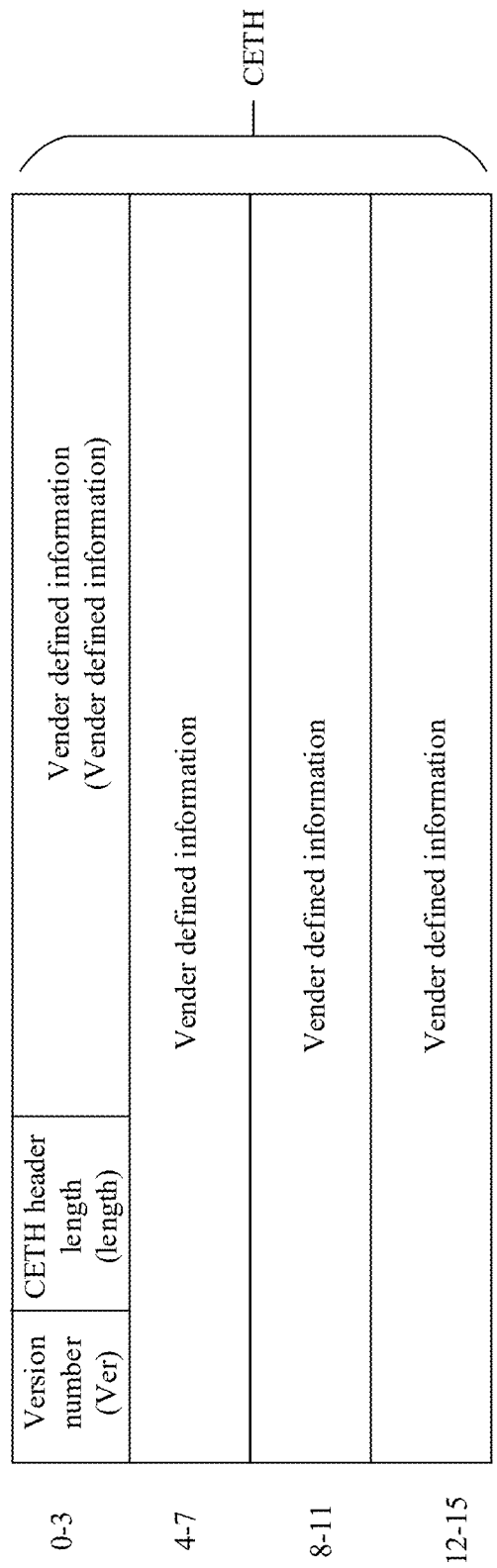
FIG. 8 is an example diagram of a data structure of congestion information according to an embodiment of the present disclosure.

The following describes a manner of designing congestion information provided in an embodiment of the present disclosure. FIG. 8 is an example diagram of a data structure of congestion information according to an embodiment of the present disclosure. In this specification, the data structure of the congestion information may be referred to as a CETH. As shown in FIG. 8, the CETH (which may also be referred to as a CETH header) includes two parts: a standard definition and vendor defined information (Vendor defined information). The standard definition part may be used for compatible interconnection in a hybrid networking scenario. The standard definition part may include the following fields: a version number (Ver) and a CETH header length.

The vendor defined information field is used to support congestion notification information defined by various vendors. For example, a total length of the CETH is (Length*4−1) bytes. For example, a vendor may design at least one of the following information: a congestion degree, a congestion location, a packet queue length, and a network delay that are of a bearer network path. For example, the congestion degree of the network path may be represented by a 2-bit ratio field, and the ratio field is used to identify the congestion degree. In an application scenario, a ratio field may indicate a congestion degree based on a level, for example, no congestion, slight congestion, moderate congestion, or severe congestion.

In addition, in specific implementation, more other content may be designed for the vendor defined information. For example, a 1-bit field is designed to indicate whether a current congestion notification is of a common CNP type or an enhanced CNP type. For another example, a 4-bit field may be designed to identify a service scenario, for example, an RC/XRC write/send scenario, an RC/XRC read response scenario, or a UD send scenario.

The Ver field indicates a CETH version number. For example, the Ver field may occupy 4 bits, and is used to support upgrading of a congestion control algorithm and compatible interconnection. A version number 0 indicates a standard CNP notification and does not carry other information. Version numbers 1 to 15 are defined by a vendor for use.

The Length field indicates a length of the CETH header. For example, the Length field occupies 4 bits, and supports a variable length of the CETH header to reduce fixed overheads. For example, a value of Length may be 1 to 4, and indicates a quantity of 4-bytes of the CETH header.

Based on the foregoing indication information and congestion information, the following describes data structures of some possible acknowledgment packets.

Figure 9:
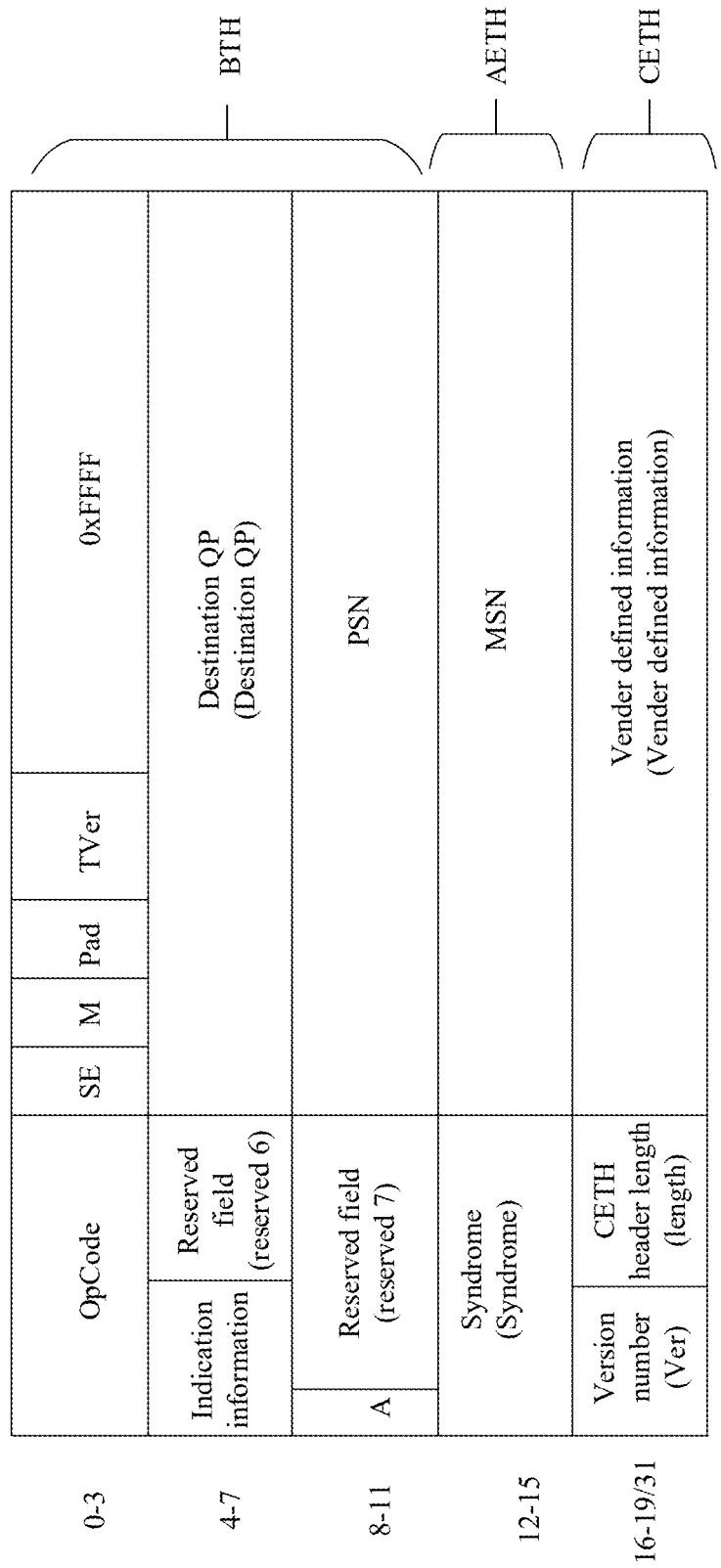
FIG. 9 is a schematic diagram of a data structure of an acknowledgment packet according to an embodiment of the present disclosure.

FIG. 9 is a schematic diagram of a data structure of an acknowledgment packet according to the present disclosure. As shown in FIG. 9, the acknowledgment packet further includes acknowledgment information and a CETH.

The acknowledgment information further includes a BTH or BTH field and an acknowledge extended transport header (AETH). In other words, the acknowledgment information may be carried by using the BTH and the AETH. The acknowledgment information is used to implement a function of an ACK, that is, notifying an RNIC in a source end device whether the packet sent by the source end device has been successfully transmitted by a destination end device. In this embodiment, indication information indicating whether a network path between the source end device and the destination end device is congested may also be carried in the BTH field.

For related subfields (for example, OpCode, SE, Destination QP, Pad, and TVer) of the BTH and the AETH, refer to a related description of an existing technical solution. Details are not described herein.

The CETH is an extension field designed in the present disclosure. In this embodiment, the CETH as an optional item may be aggregated after the AETH in the acknowledgment packet, to implement aggregation of the acknowledgment information, the indication information, and the CETH. The CETH indicates a specific network status of the current network path. When network congestion occurs, the acknowledgment packet carries the indication information and the CETH is aggregated in the acknowledgment packet, so that the destination end device notifies in time the source end device that network congestion occurs. When no network congestion occurs, the acknowledgment packet carries the indication information but does not carry a CETH, so that the destination end device notifies in time the source end device that congestion is eliminated.

The CETH carries network status information such as a congestion degree, a congestion location, a packet queue length, and a network delay that are of a network path. This helps to resolve a problem that an existing RoCE network is not friendly to implementation of efficient congestion control due to a small amount of congestion notification information. Packet aggregation and carrying of the indication information also help to resolve a problem of a low congestion control response speed in the RoCE network.

In a specific application scenario, when a RoCE protocol packet received by an RNIC in the destination end device does not carry an ECN flag, the RNIC in the destination end device returns, to the source end device, an acknowledgment packet that does not carry a CETH header, where the acknowledgment packet includes only acknowledgment information and indication information. In this way, the RNIC in the source end device is notified that the protocol packet from the source end device has been received and that no congestion occurs in the network.

When a RoCE protocol packet received by the RNIC in the destination end device carries an ECN flag, the RNIC in the destination end device returns, to the source end device, an ACK carrying a CETH header, where the ACK includes acknowledgment information, indication information, and congestion information. In this way, the RNIC in the source end device is notified that the protocol packet from the source end device has been received and that congestion occurs in the network. In addition, the RNIC in the source end device obtains detailed network status information, for example, information in different dimensions such as a congestion degree, a congestion location, a queue depth, and a network delay, to implement quantitative congestion control based on the information.

For example, network congestion degrees indicated in the congestion information may be divided into a plurality of levels such as "no congestion, slight congestion, moderate congestion, and severe congestion", the RNIC in the source end device may determine, based on a specific congestion degree, how to implement rate reduction processing to adjust packet sending rates of different levels. Therefore, faster rate convergence can be implemented.

For another example, for the congestion location and queue depth information, the RNIC in the source end device may determine, based on such information, a quantity of data packets that can continue to be sent in the network path without causing a packet loss and the like, to determine a quantity of packets that can continue to be sent. This is relatively friendly to a network application with a high bandwidth requirement.

Figure 10:
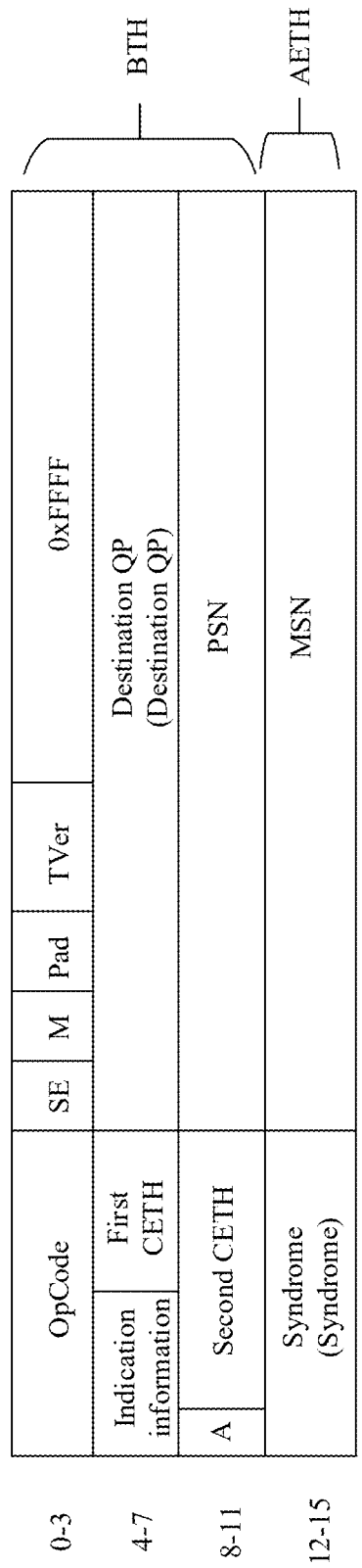
FIG. 10 is a schematic diagram of a data structure of another acknowledgment packet according to an embodiment of the present disclosure.

FIG. 10 is a schematic diagram of a data structure of another acknowledgment packet according to the present disclosure. In this embodiment, a CETH (congestion information) may be carried by using space of an existing field. As shown in FIG. 10, the CETH is integrated into a BTH field in an acknowledgment packet. In this embodiment, indication information indicating whether a network path between a source end device and a destination end device is congested may also be carried in the BTH field. In this case, the acknowledgment packet may be considered as an improvement of a conventional ACK packet, and the space of the existing field is fully utilized to carry the congestion information. The acknowledgment packet can implement a function of an ACK, that is, that is, notifying an RNIC in the source end device whether the packet sent by the source end device has been successfully transmitted by the destination end device. The acknowledgment packet can also implement a congestion indication function, that is, indicating whether the network path between the source end device and the destination end device is congested. In addition, the RNIC in the source end device obtains detailed network status information, for example, information in different dimensions such as a congestion degree, a congestion location, a queue depth, and a network delay, to implement quantitative congestion control based on the information.

For example, in an implementation, a reserved field "reserved 6" in a BTH in a standard ACK may be used to carry the congestion information in this embodiment of the present disclosure. In other words, "reserved 6" is used as a first CETH to carry related data. This implements aggregation of congestion control information and transmission acknowledgment information.

For another example, in an implementation, a reserved field "reserved 7" in a BTH in a standard ACK may be used to carry the congestion information in this embodiment of the present disclosure. In other words, "reserved 7" is used as a second CETH to carry related data. This implements aggregation of congestion control information and transmission acknowledgment information.

A specific implementation form of each of the first CETH and the second CETH may include only information such as a congestion degree, a congestion location, a queue depth, and a network delay, or may further include other information described in the embodiment in FIG. 8, for example, a version number.

Figure 11:
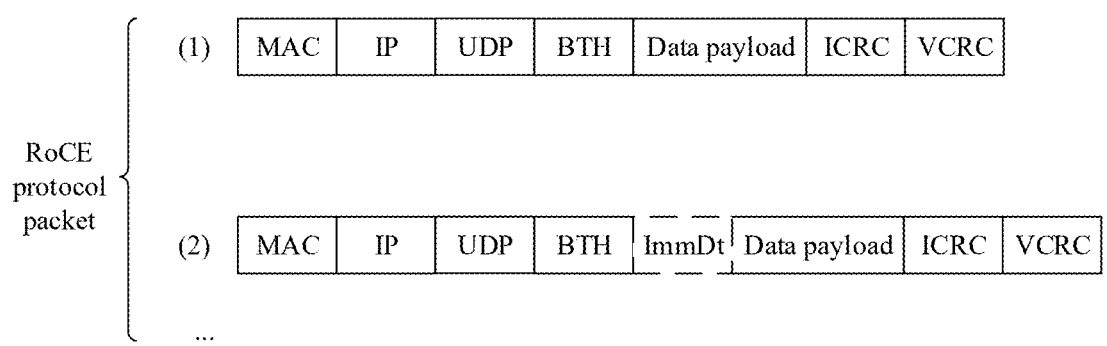
FIG. 11 is a schematic diagram of complete forms of some ROCE protocol packets according to an embodiment of the present disclosure.
Figure 12:
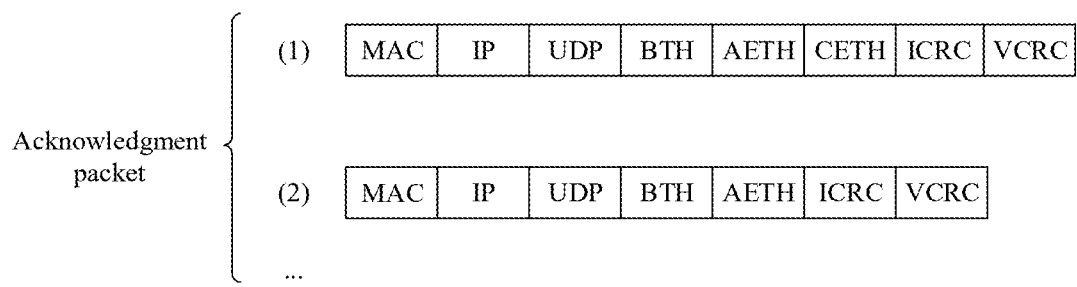
FIG. 12 is a schematic diagram of complete forms of some acknowledgment packets according to an embodiment of the present disclosure.

FIG. 11 and FIG. 12 show examples of complete forms of some ROCE protocol packets and complete forms of corresponding acknowledgment packets in embodiments of the present disclosure.

As shown in FIG. 11, a RoCE protocol packet from a source end device may include a media access control (MAC) packet header, an Internet Protocol (IP) packet header, a User Datagram Protocol (UDP) packet header, a BTH header, a data payload, an invariant cyclic redundancy check (ICRC) value, and a variant cyclic redundancy check (VCRC) value. The MAC packet header, the IP packet header, and the UDP packet header are respectively packet headers corresponding to a MAC layer, an IP layer, and a UDP layer. The data payload is data that needs to be transmitted during communication interaction between devices. The ICRC value and the VCRC value may be used to check data integrity. Another ROCE protocol packet may include a MAC packet header, an IP packet header, a UDP packet header, a BTH header, an ImmDt field, a data payload, an ICRC value, and a VCRC value.

It should be noted that, in actual application, the ROCE protocol packet may further include more or less content. This is not limited in the present disclosure.

As shown in FIG. 12, an acknowledgment packet from a destination end device may include a MAC packet header, an IP packet header, a UDP packet header, a BTH header, an AETH header, a CETH header, an ICRC value, and a VCRC value. The MAC packet header, the IP packet header, and the UDP packet header are respectively packet headers corresponding to a MAC layer, an IP layer, and a UDP layer, and the ICRC value and the VCRC value may be used to check data integrity. For specific content and implementation forms of the BTH header, the AETH header, and the CETH header herein, refer to a related description in the embodiment in FIG. 9. Another acknowledgment packet may include a MAC packet header, an IP packet header, a UDP packet header, a BTH header, an AETH header, an ICRC value, and a VCRC value. For specific content and implementation forms of the BTH header and the AETH header herein, refer to a related description in the embodiment in FIG. 10.

It should be noted that, in actual application, the acknowledgment packet may further include more or less content. This is not limited in the present disclosure.

Based on the system architecture and the packet data structures described above, the following describes a congestion control method provided in embodiments of the present disclosure. For convenience, the method embodiments described below are expressed as a combination of a series of action steps. However, a person skilled in the art should understand that specific implementations of the technical solutions of the present disclosure are not limited to a sequence of the described series of action steps.

Figure 13:
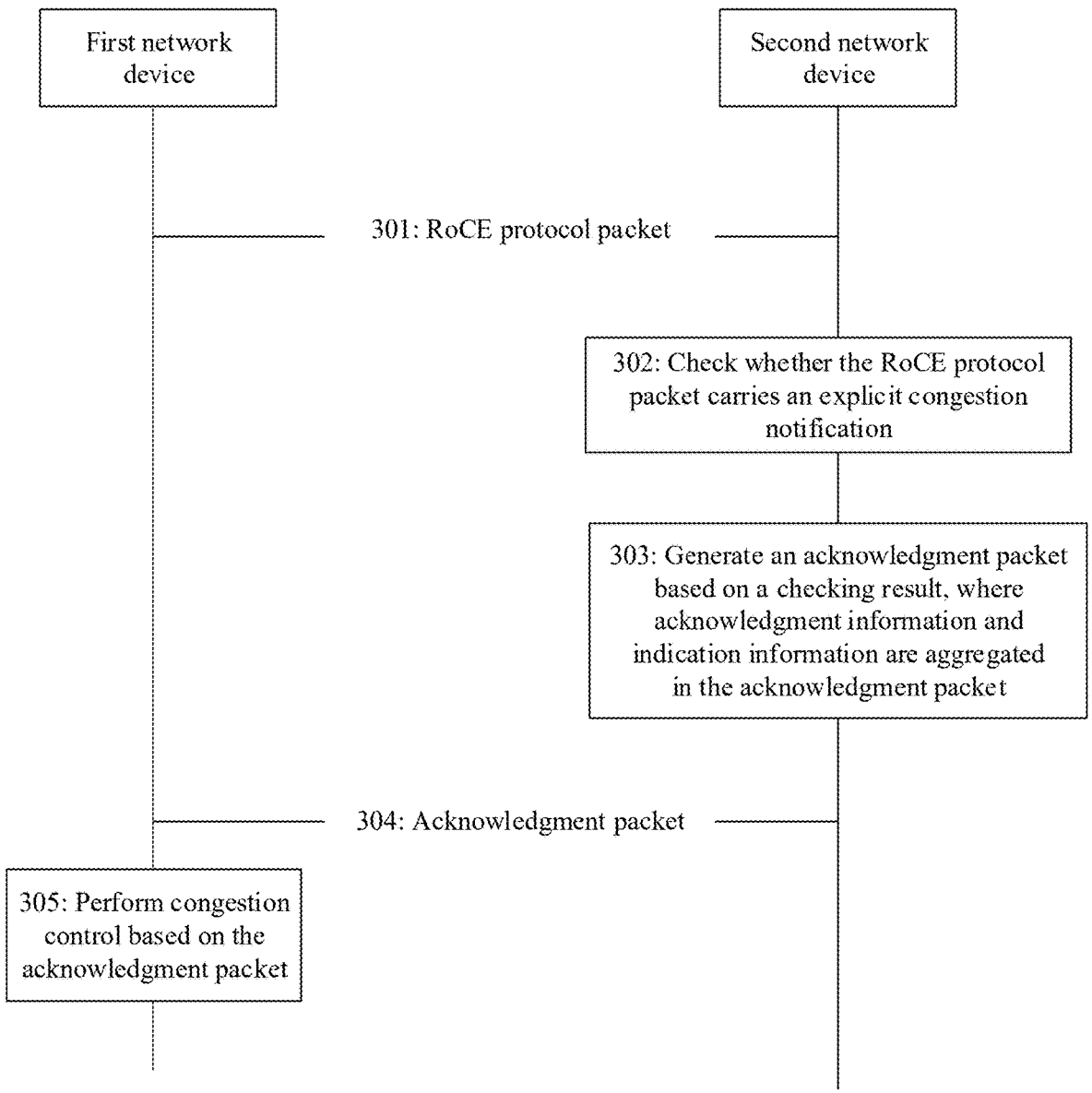
FIG. 13 is a schematic flowchart of a RoCE network congestion control method according to an embodiment of the present disclosure.

FIG. 13 is a schematic flowchart of a RoCE network congestion control method according to an embodiment of the present disclosure. The method is described from a perspective of interaction between a first network device and a second network device. The first network device and the second network device each may be an RNIC, a network interface controller, a network adapter, a network interface card, a local area network adapter, or the like. For example, the first network device may be an RNIC in a source end device, the second network device may be an RNIC in a destination end device, and the first network device and the second network device may be connected to each other through a network. The method includes but is not limited to the following steps.

S301: The first network device sends a RoCE protocol packet to the second network device. The ROCE protocol packet may be generated based on a service requirement of a user, and the RoCE protocol packet may be a periodic packet. Specific content of the ROCE protocol packet has been described in the foregoing, and S302: The second network device checks whether the ROCE protocol packet carries an explicit congestion notification.

When congestion occurs due to excessively large traffic in the network, a CP device in the network may perform RED ECN marking on a packet. When receiving the packet carrying an ECN flag, the second network device determines that the network is currently congested. On the contrary, when receiving a packet that does not carry an ECN flag, the second network device determines that the network is not congested currently.

S303: The second network device generates an acknowledgment packet based on a checking result, where at least acknowledgment information and indication information are aggregated in the acknowledgment packet. The indication information indicates whether a network path between the first network device and the second network device is congested.

In this embodiment of the present disclosure, the indication information may be an indication bit, an indication field, an indication identifier, or the like. For example, when the indication information is an indication bit, and a value of the indication bit is 0, it means that the destination end device indicates, to the RNIC in the source end device, that no network congestion occurs in the current network path, and the acknowledgment packet does not carry congestion information; and when a value of the indication bit is 1, it means that the destination end device indicates, to the RNIC in the source end device, that network congestion occurs in the current network path, and the acknowledgment packet carries congestion information.

In an embodiment, the acknowledgment information and the indication information may be set at different locations in the packet, for example, may be distributed in different packet headers, to avoid changing of a field in the acknowledgment packet. In another embodiment, the indication information may be integrated into a field in the acknowledgment packet to fully utilize space in the field in the acknowledgment packet.

S304: The second network device returns the acknowledgment packet to the first network device, and correspondingly, the first network device receives the acknowledgment packet from the second network device.

S305: The first network device performs congestion control based on the acknowledgment packet.

In this embodiment of the present disclosure, congestion control is a function used to adjust a quantity of packets sent through a transmission control protocol (ROCE protocol) connection in one period (a quantity of packets sent in one period). The quantity of packets sent in one period and sending frequency can be quantitatively increased or decreased through congestion control, so that an adjusted quantity of packets sent in one period and adjusted sending frequency are close to a most suitable bearing capability of the current network. For example, when the indication information indicates that the current network is congested, the first network device may reduce a sending rate of the ROCE protocol packet in a next time window; or when the indication information indicates that the current network is not congested, the first network device may keep a sending rate of the ROCE protocol packet in a next time window unchanged, or set a sending rate of the ROCE protocol packet in a next time window to a preset rate.

It can be learned that, during implementation of this embodiment of the present disclosure, when the ROCE protocol packet carries an ECN flag, the destination end device may return, by using the second network device, the acknowledgment information packet in which the indication information is aggregated, where the indication information is used to notify the source end device that network congestion occurs in the current network path. The first network device in the source end device may reduce the sending rate of the ROCE protocol packet in the next time window. When the ROCE protocol packet does not carry an ECN flag, the destination end device may return an acknowledgment packet, and notify the source end device that no network congestion occurs in the current network path, so that the source end device maintains or restores to a high sending rate in time.

In this way, the indication information and the acknowledgment information to avoid sending of an independent CNP, thereby reducing notification overheads, helping to reduce a congestion notification delay in a large-traffic scenario, and increasing a response speed of the destination end device.

In addition, the source end device can immediately learn of a network congestion status based on the indication information, to trigger congestion control earlier to adjust a sending rate, thereby increasing a response speed of the source end device. When network congestion is eliminated, the source end device can also learn, based on the indication information, that network congestion is eliminated, and restore a sending rate in time, thereby improving utilization of network bandwidth.

Figure 14:
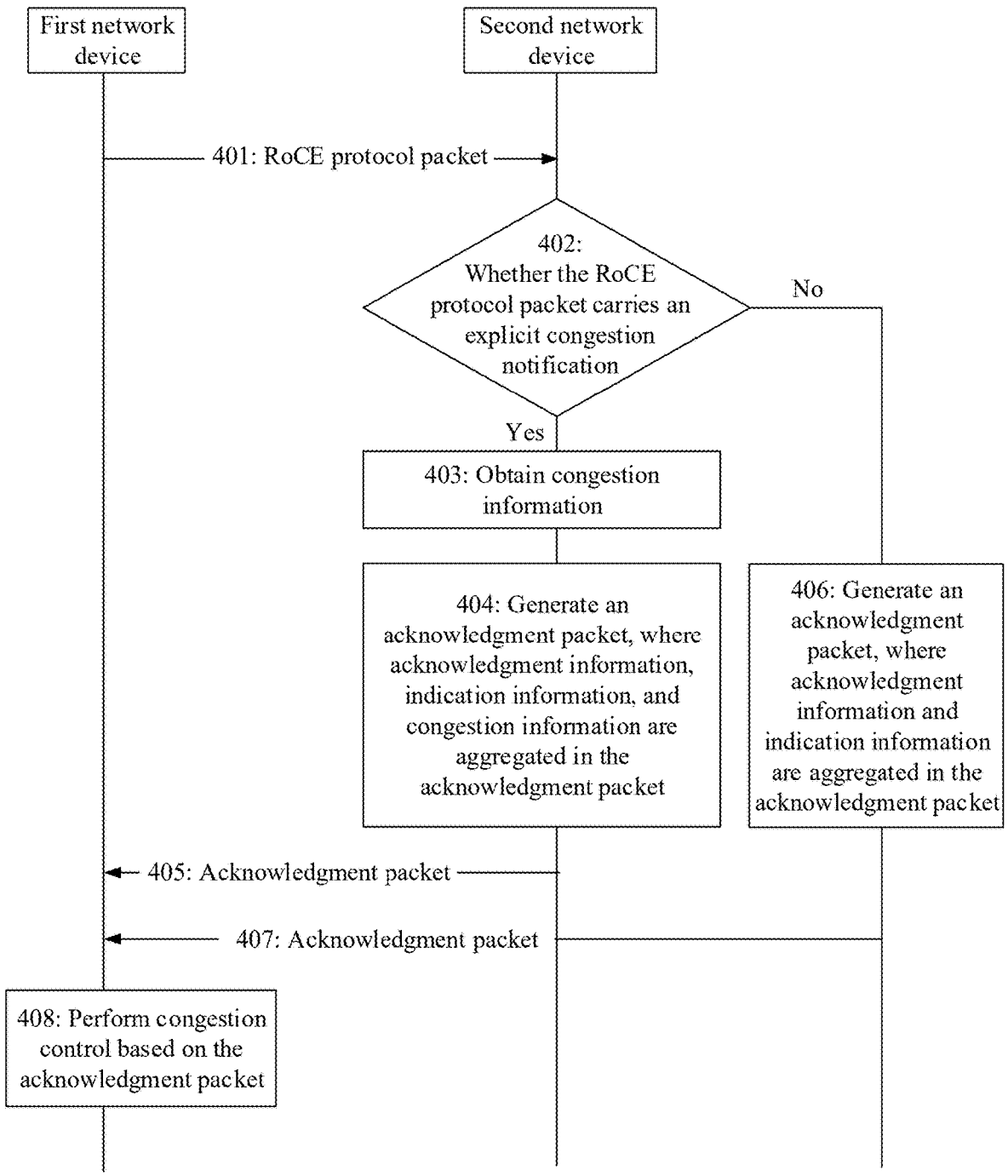
FIG. 14 is a schematic flowchart of another ROCE network congestion control method according to an embodiment of the present disclosure.

FIG. 14 is a schematic flowchart of another RoCE network congestion control method according to an embodiment of the present disclosure. The method is described from a perspective of interaction between a first network device and a second network device. The first network device and the second network device each may be an RNIC, a network interface controller, a network adapter, a network interface card, a local area network adapter, or the like. For example, the first network device may be an RNIC in a source end device, the second network device may be an RNIC in a destination end device, and the first network device and the second network device may be connected to each other through a network. The method includes but is not limited to the following steps.

S401: The first network device sends a RoCE protocol packet to the second network device. Specific content of the ROCE protocol packet has been described in the foregoing, and S402: The second network device checks whether the ROCE protocol packet carries an explicit congestion notification (ECN). When determining that the ROCE protocol packet carries an explicit congestion notification, the second network device subsequently performs steps S403 to S405; or when determining that the ROCE protocol packet does not carry an explicit congestion notification, the second network device subsequently performs steps S406 and S407.

S403: The second network device obtains congestion information, where the congestion information indicates a specific network status.

Specifically, when the current network is congested, the second network device may obtain, through packet detection or hardware detection, network status information, for example, information in different dimensions such as a congestion degree, a congestion location, a queue depth, and a network delay.

For example, when the congestion information includes the congestion degree, the second network device may obtain the congestion degree in the following manners:

(1) The second network device determines the congestion degree of the network path based on a proportion of ROCE protocol packets that are in a historical packet receiving record and that carry an explicit congestion notification. For example, the second network device periodically performs window sliding to obtain a proportion of received packets carrying an ECN flag, to calculate a specific congestion degree of the current network path.

(2) The congestion degree is obtained in an INT manner or in an IOAM manner. The INT manner is used as an example. A range supported by INT may be extended to a network interface card of a server, and the network interface card may receive measurement information that is of a switch and that is inserted into a data packet. A current network status may be obtained through calculation based on the information. For example, the network delay is calculated by using a timestamp, and the congestion degree is calculated by using a queue length and a queue occupancy rate.

S404: The second network device generates an acknowledgment packet, where acknowledgment information, indication information, and congestion information are aggregated in the acknowledgment packet. The congestion information may be implemented, for example, by a CETH described in this specification. The CETH may be an extension field or may be implemented by using an existing reserved field.

The acknowledgment information is used to implement a function of an ACK, and the indication information indicates that a network path between the source end device and the destination end device is congested.

In an embodiment, the acknowledgment information, the indication information, and the congestion information in the acknowledgment packet may be set at different locations in the packet, for example, may be distributed in different packet headers, to avoid changing of a field in the acknowledgment packet.

In another embodiment, the indication information and/or the congestion information may be integrated into a field in the acknowledgment packet to fully utilize space in the field in the acknowledgment packet.

For aggregation of the acknowledgment information, the indication information, and the congestion information, refer to the description of the embodiment in FIG. 9 or FIG. 10.

S405: The second network device sends the acknowledgment packet generated in S404 to the first network device.

S406: The second network device generates an acknowledgment packet, where acknowledgment information and indication information are aggregated in the acknowledgment packet.

The acknowledgment information is used to implement a function of an ACK, and the indication information indicates that the network path between the source end device and the destination end device is not congested.

S407: The second network device sends the acknowledgment packet generated in S406 to the first network device.

S408: The first network device performs quantitative congestion control based on the acknowledgment packet.

Specifically, after receiving the acknowledgment packet sent in S405, the first network device determines, based on the indication information, that the current network is congested. The first network device may perform congestion control based on the congestion information in the acknowledgment packet in at least one of the following manners:

(1) The first network device may quantitatively adjust a packet sending rate of the first network device in a next time window based on the congestion degree, where there is a correspondence between the congestion degree and the sending rate. For example, for a plurality of levels such as "no congestion, slight congestion, moderate congestion, and severe congestion", the first network device may determine, based on a specific congestion degree, how to implement rate reduction processing. Different levels may correspond to different packet sending rates to adjust packet sending rates of different levels. Therefore, faster rate convergence can be implemented.

(2) The first network device may determine a quantity of to-be-sent packets in a next time window based on at least one of the congestion location and the packet queue depth. An RNIC in the source end device may determine, based on the congestion location and/or the packet queue depth, a quantity of data packets that can continue to be sent in the network path without causing a packet loss and the like, to determine a quantity of packets that can continue to be sent. This is relatively friendly to a network application with a high bandwidth requirement.

(3) The first network device may adjust a sending rate of the first network device or a quantity of to-be-sent packets in a next time window based on the network delay.

After receiving the acknowledgment packet sent in S407, the first network device determines, based on the indication information, that the current network is not congested, and the first network device may keep the sending rate of the ROCE protocol packet in the next time window unchanged, or restore/set the sending rate of the ROCE protocol packet in the next time window to a preset rate.

Figure 15:
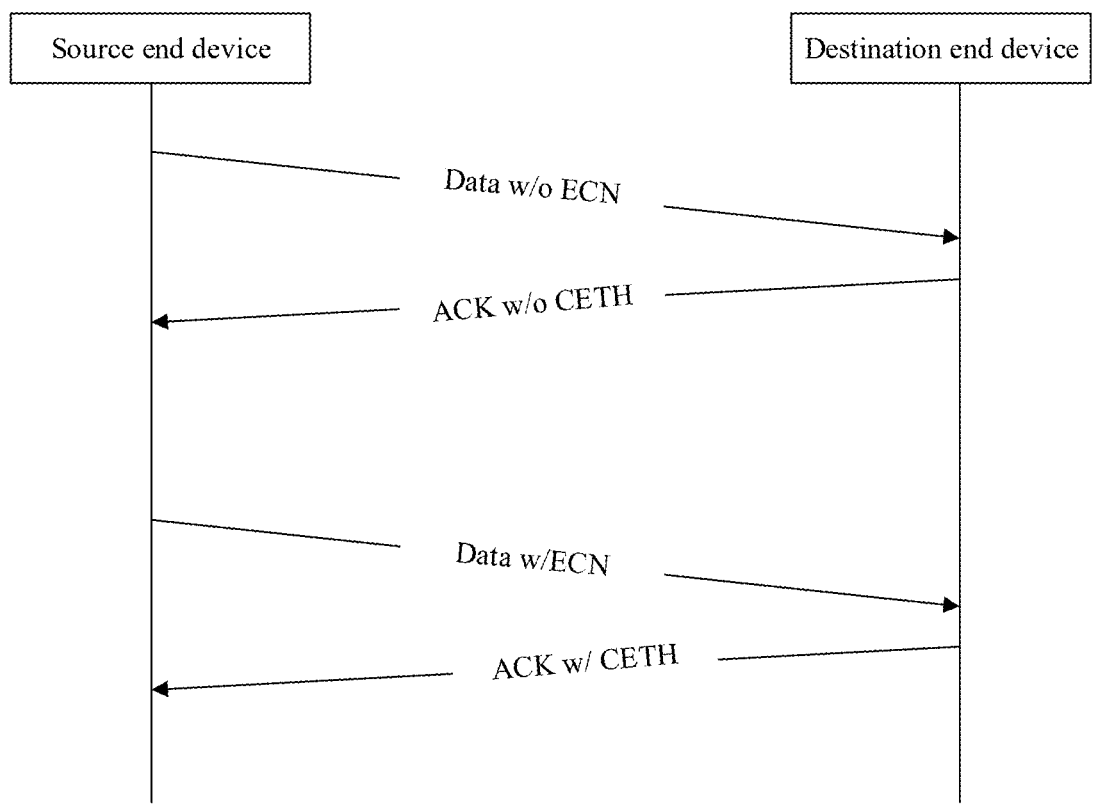
FIG. 15 is a scenario diagram of a device communication process according to an embodiment of the present disclosure.

It can be learned from the foregoing embodiment that, according to the solution in the present disclosure, a RoCE congestion notification and the acknowledgment information can be carried through aggregation, and that network congestion occurs and that network congestion is eliminated can be notified by using the indication information. When network congestion occurs, a defined CETH carries detailed network congestion status information. Specifically, as shown in FIG. 15:

When network congestion occurs, a packet received by the destination end device carries an ECN flag (denoted as data w/ECN). In this embodiment of the present disclosure, a returned ACK message is redefined as an ACK in which the CETH is aggregated (denoted as ACK w/CETH). The CETH header is carried after an AETH header through extension to carry quantitative congestion information. CNPs used in both RDMA write and RDMA send for connection in original application scenarios such as RC, XRC, and RD may be aggregated to an ACK. Therefore, in this embodiment of the present disclosure, the destination end device does not need to separately return a CNP to the source end device.

When network congestion is eliminated, a packet received by the destination end device does not carry an ECN flag (denoted as data w/o ECN). In this embodiment of the present disclosure, a returned ACK message is redefined as an ACK in which no CETH is aggregated (denoted as ACK w/o CETH), so that the source end device learns of a current network status to quickly restore a sending rate.

Figure 16:
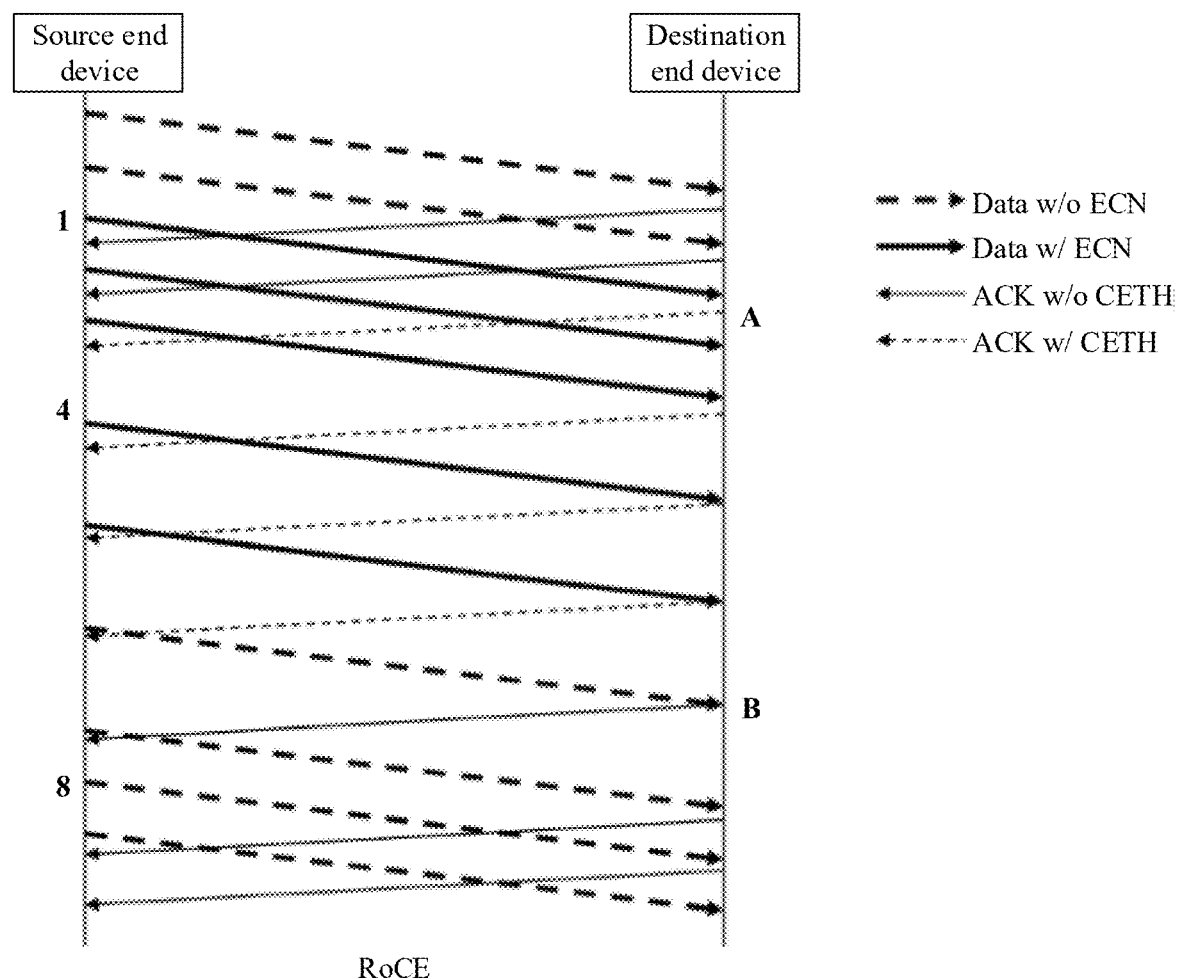
FIG. 16 is a scenario diagram of a device communication process in a scenario in which there is large traffic in a network according to an embodiment of the present disclosure.

The following uses FIG. 16 as an example to further understand technical effects of the solutions in the present disclosure. FIG. 16 shows an example of a device communication process in a scenario in which there is large traffic in a network. As shown in FIG. 16, when network congestion occurs during forwarding of a data packet 1, after a destination end device aggregates a RoCE congestion notification CETH in an acknowledgment packet, a source end device obtains the congestion notification faster when congestion occurs, to perform a congestion control operation faster. For example, in FIG. 16, the source end device performs rate reduction when starting to send a protocol packet 4. Compared with the method for notifying an independent CNP in FIG. 3, a packet sending rate can be reduced faster in the device communication process. The aggregation method may further support the destination end device in notifying, by using indication information in an acknowledgment packet, the source end device that network congestion is eliminated. After receiving a congestion elimination notification, the source end device can quickly increase a packet sending rate. As shown in FIG. 16, the source end device may restore a sending rate when starting to send a data packet 8. Compared with an existing periodic detection method that depends on a source end device, the packet sending rate can be increased faster in the device communication process.

In addition, because accurate and detailed congestion notification information is extended, the sending rate can be accurately controlled to be reduced to a target rate in the first rate reduction period, thereby implementing faster convergence. As shown in FIG. 16, after congestion notification information A is received, a sending rate of the data packet 4 that is first sent may be rapidly converged to the target rate.

It can be learned that, during implementation of embodiments of the present disclosure, when a RoCE protocol packet carries an ECN flag, the second network device in the destination end device may return an acknowledgment information packet in which a CETH and indication information are aggregated, where the indication information is used to notify the source end device that network congestion occurs in the current network path, and the CETH is used to provide detailed congestion information to the source end device. In this way, the first network device in the source end device extracts the congestion information from the CETH to perform quantitative and diversified congestion control operations. When a RoCE protocol packet does not carry an ECN flag, the destination end device may return an acknowledgment packet, and notify the source end device that no network congestion occurs in the current network path, so that the source end device maintains or restores to a high sending rate in time.

In this way, the indication information, the congestion information, and the acknowledgment information to avoid sending of an independent CNP, thereby reducing notification overheads, helping to reduce a congestion notification delay in a large-traffic scenario, and increasing a response speed of the destination end device.

In addition, the source end device can immediately learn of a network congestion status based on the indication information, to trigger congestion control earlier to adjust a sending rate, thereby increasing a response speed of the source end device. When network congestion is eliminated, the source end device can also learn, based on the indication information, that network congestion is eliminated, and restore a sending rate in time, thereby improving utilization of network bandwidth.

Finally, during existing RDMA network congestion control, there is a small amount of notification information, and a convergence speed during network congestion control is low. In contrast, in the present disclosure, the CETH is used to carry the detailed congestion information of the network, for example, information in different dimensions such as a congestion degree, a congestion location, a queue depth, and a network delay. This helps the source end device adjust the sending rate to a target rate in one step based on the detailed congestion information, to implement fast convergence and diversified adjustment of a quantity of packets, a sending time, and the like, thereby greatly improving a congestion control effect.

It should be understood that, in embodiments of the present disclosure, sequence numbers of the foregoing processes do not mean execution sequences. The execution sequences of the processes should be determined based on functions and internal logic of the processes, and should not constitute any limitation to implementation processes of embodiments of the present disclosure.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of the present disclosure.

In the foregoing embodiments, the description of embodiments has respective focuses. For a part that is not described in detail in an embodiment, refer to a related description in other embodiments.

It may be clearly understood by a person skilled in the art that, for the purpose of a convenient and brief description, for a detailed working process of the foregoing system, apparatus, and unit, refer to a corresponding process in the foregoing method embodiments. In the several embodiments provided in the present disclosure, it should be understood that the disclosed system, apparatus, and method may be implemented in other manners. For example, the described apparatus embodiments are merely examples. For example, division into units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

In addition, function modules in embodiments of the present disclosure may be integrated into one processing unit, or each of the units may exist alone physically, or two or more units are integrated into one unit. When the functions are implemented in a form of a software functional unit and sold or used as an independent product, the functions may be stored in a computer-readable storage medium. Based on such an understanding, the technical solutions of the present disclosure essentially, or the part contributing to the conventional technology, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in embodiments of the present disclosure. The foregoing storage medium includes: any medium that can store program code, such as a universal serial bus (USB) flash drive, a removable hard disk, a ROM, a RAM, a magnetic disk, or an optical disc.

The foregoing embodiments are merely used to describe the technical solutions of the present disclosure, but are not intended to limit the technical solutions. Although the present disclosure is described in detail with reference to the foregoing embodiments, a person of ordinary skill in the art should also understand that: Any modification, transformation, or equivalent replacement of some technical features that is made based on the technical solutions described in the foregoing embodiments shall fall within the spirit and scope of the technical solutions in embodiments of the present disclosure.

What is claimed is:

1. A remote direct memory access (RDMA) over converged Ethernet (RoCE) network congestion control method implemented by a first network device, the RoCE network congestion control method comprising:
    sending an RoCE protocol packet to a second network device;
    receiving, from the second network device, an acknowledgment packet to the RoCE protocol packet comprising indication information and acknowledgment information, wherein the indication information indicates whether a network path between the first network device and the second network device is congested, wherein when the indication information indicates that the network path is congested, the acknowledgment packet further comprises a congestion extended transport header (CETH), wherein the CETH comprises a standard definition and vendor defined information, wherein the standard definition supports compatible interconnection in a hybrid networking scenario, and wherein the vendor defined information carries vendor-defined congestion information; and
    performing congestion control based on the vendor-defined congestion information in the acknowledgment packet.

2. The RoCE network congestion control method of claim 1, wherein the vendor-defined congestion information comprises at least one of a congestion location or a packet queue length, wherein performing congestion control based on the vendor-defined congestion information in the acknowledgment packet comprises performing congestion control based on both the congestion location and the packet queue length when the vendor-defined congestion information comprises both the congestion location and the packet queue length.

3. The RoCE network congestion control method of claim 1, wherein the vendor-defined congestion information comprises a congestion degree, and wherein performing the congestion control based on the vendor-defined congestion information comprises:
    adjusting a sending rate of the first network device based on the congestion degree, wherein there is a correspondence between the congestion degree and the sending rate; and
    determining a quantity of to-be-sent packets in a next time window based on at least one of the vendor-defined congestion information.

4. The RoCE network congestion control method of claim 3, wherein the congestion degree is one of congestion degrees at a plurality of different levels, and wherein the congestion degrees correspond to different sending rates.

5. The RoCE network congestion control method of claim 1, wherein the acknowledgment packet further comprises a basic transmission header (BTH) carrying the indication information.

6. The RoCE network congestion control method of claim 1, wherein the acknowledgment packet further comprises an Acknowledge Extended Transport Header (AETH) carrying the acknowledgment information.

7. A remote direct memory access (RDMA) over converged Ethernet (RoCE) network congestion control method implemented by a second network device, the RoCE network congestion control method comprising:
    receiving, from a first network device, an RoCE protocol packet;
    determining whether the ROCE protocol packet carries an explicit congestion notification;
    generating an acknowledgment packet to ROCE protocol pack that is based on whether the RoCE protocol packet carries the explicit congestion notification, wherein the acknowledgment packet comprises indication information and acknowledgment information, wherein the indication information indicates whether a network path between the first network device and the second network device is congested, and wherein when the indication information indicates that the network path is congested, the acknowledgment packet further comprises a congestion extended transport header (CETH), wherein the CETH comprises a standard definition and vendor defined information, wherein the standard definition supports compatible interconnection in a hybrid networking scenario, and wherein the vendor defined information carries vendor-defined congestion information; and
    sending, to the first network device, the acknowledgment packet.

8. The RoCE network congestion control method of claim 7, wherein the vendor-defined congestion information comprises at least one of a congestion location or a packet queue length that is used for performing the congestion control.

9. The RoCE network congestion control method of claim 7, wherein the vendor-defined congestion information comprises a congestion degree, and wherein the congestion degree is one of congestion degrees at a plurality of different levels, and wherein the congestion degrees correspond to different sending rates of the first network device.

10. The RoCE network congestion control method of claim 8, wherein the acknowledgment packet further comprises a basic transmission header (BTH) carrying the indication information.

11. The RoCE network congestion control method of claim 8, wherein the acknowledgment packet further comprises an Acknowledge Extended Transport Header (AETH) carrying the acknowledgment information.

12. A first network device comprising:
a memory configured to store instructions; and
one or more processors coupled to the memory and configured to execute the instructions to cause the first network device to:
   send a remote direct memory access (RDMA) over converged Ethernet (RoCE) protocol packet to a second network device;
   receive an acknowledgment packet to the ROCE protocol packet from the second network device, wherein the acknowledgment packet comprises indication information and acknowledgment information, and wherein the indication information indicates whether a network path between the first network device and the second network device is congested, wherein when the indication information indicates that the network path is congested, the acknowledgment packet further comprises a congestion extended transport header (CETH), wherein the CETH comprises a standard definition and vendor defined information, wherein the standard definition supports compatible interconnection in a hybrid networking scenario, and wherein the vendor defined information carries vendor-defined congestion information; and
   perform congestion control based on the vendor-defined congestion information in the acknowledgment packet.

13. The first network device of claim 12, wherein the vendor-defined congestion information comprises at least one of a congestion location or a packet queue length, and wherein the first network device is further configured to perform the congestion control based on both the congestion location and the packet queue length when the vendor-defined congestion information comprises both the congestion location and the packet queue length.

14. The first network device of claim 12, wherein the vendor-defined congestion information comprises a congestion degree, and wherein the first network device is further configured to:
   adjust a sending rate of the first network device based on the congestion degree, wherein there is a correspondence between the congestion degree and the sending rate; and
   determine a quantity of to-be-sent packets in a next time window based on at least one of the vendor-defined congestion information.

15. The first network device of claim 13, wherein the acknowledgment packet further comprises a basic transmission header (BTH) carrying the indication information.

16. The first network device of claim 13, wherein the acknowledgment packet further comprises an Acknowledge Extended Transport Header (AETH) carrying.

17. A second network device comprising:
a memory configured to store instructions; and
one or more processors coupled to the memory and configured to execute the instructions to cause the second network device to:
   receive a remote direct memory access (RDMA) over converged Ethernet (RoCE) protocol packet from a first network device;
   determine whether the ROCE protocol packet carries an explicit congestion notification; and
   generate an acknowledgment packet to the RoCE protocol packet based on whether the ROCE protocol packet carries the explicit congestion notification, wherein the acknowledgment packet comprises indication information and acknowledgment information when the ROCE protocol packet carries the explicit congestion notification, wherein the indication information indicates whether a network path between the first network device and the second network device is congested, and wherein when the indication information indicates that the network path is congested, the acknowledgment packet further comprises a congestion extended transport header (CETH), wherein the CETH comprises a standard definition and vendor defined information, wherein the standard definition supports compatible interconnection in a hybrid networking scenario, and wherein the vendor defined information carries vendor-defined congestion information; and
   send the acknowledgment packet to the first network device.

18. The second network device of claim 17, wherein the vendor-defined congestion information is for performing congestion control.

19. The second network device of claim 18, wherein the vendor-defined congestion information further comprises a congestion degree, and wherein the congestion degree is one of congestion degrees at a plurality of different levels, and wherein the congestion degrees correspond to different sending rates of the first network device.

20. The second network device of claim 18, wherein the vendor-defined congestion information comprises at least one of a congestion location or a packet queue length.

* * * * *